(12) United States Patent
Soma

(10) Patent No.: US 10,375,431 B2
(45) Date of Patent: Aug. 6, 2019

(54) INFORMATION PROCESSING APPARATUS AND INFORMATION PROCESSING METHOD TO PROVIDE PRIVILEGE

(71) Applicant: SONY CORPORATION, Tokyo (JP)

(72) Inventor: Isao Soma, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/906,061

(22) PCT Filed: Jun. 6, 2014

(86) PCT No.: PCT/JP2014/065047
§ 371 (c)(1),
(2) Date: Jan. 19, 2016

(87) PCT Pub. No.: WO2015/012000
PCT Pub. Date: Jan. 29, 2015

(65) Prior Publication Data
US 2016/0165278 A1  Jun. 9, 2016

(30) Foreign Application Priority Data
Jul. 23, 2013  (JP) ................................ 2013-152832

(51) Int. Cl.
*G06Q 30/02* (2012.01)
*H04N 21/84* (2011.01)
(Continued)

(52) U.S. Cl.
CPC ......... *H04N 21/2541* (2013.01); *G06Q 30/02* (2013.01); *H04N 21/4382* (2013.01);
(Continued)

(58) Field of Classification Search
CPC .............. H04W 4/185; H04N 21/2541; H04N 21/4627; H04N 21/4784
See application file for complete search history.

(56) References Cited

U.S. PATENT DOCUMENTS

| | | | |
|---|---|---|---|
| 2007/0277201 A1* | 11/2007 | Wong ................. | H04N 5/44543 725/40 |
| 2010/0091198 A1 | 4/2010 | Matsuo | |
| 2014/0171039 A1* | 6/2014 | Bjontegard ....... | H04L 29/06034 455/414.1 |

FOREIGN PATENT DOCUMENTS

| | | |
|---|---|---|
| EP | 2026581 A2 | 2/2009 |
| JP | 2009-038788 A | 2/2009 |
| JP | 2009-182800 A | 8/2009 |

* cited by examiner

*Primary Examiner* — James R Marandi
(74) *Attorney, Agent, or Firm* — Chip Law Group

(57) ABSTRACT

An information processing apparatus includes a channel identification information acquisition unit configured to acquire channel identification information for receiving a broadcast from a first object, a right information acquisition unit configured to acquire right information for acquiring a privilege, the right information being associated with the broadcast indicated by the channel identification information, and a privilege information acquisition unit configured to establish communication with a second object installed in a predetermined place different from a place of the first object, to execute a process for authentication based on the right information through the communication, and to acquire privilege information indicating the privilege, the privilege information being based on a result of the authentication.

13 Claims, 12 Drawing Sheets

(51) Int. Cl.
*H04N 21/254* (2011.01)
*H04N 21/438* (2011.01)
*H04N 21/4627* (2011.01)
*H04N 21/4784* (2011.01)

(52) U.S. Cl.
CPC ..... *H04N 21/4627* (2013.01); *H04N 21/4784* (2013.01); *H04N 21/84* (2013.01)

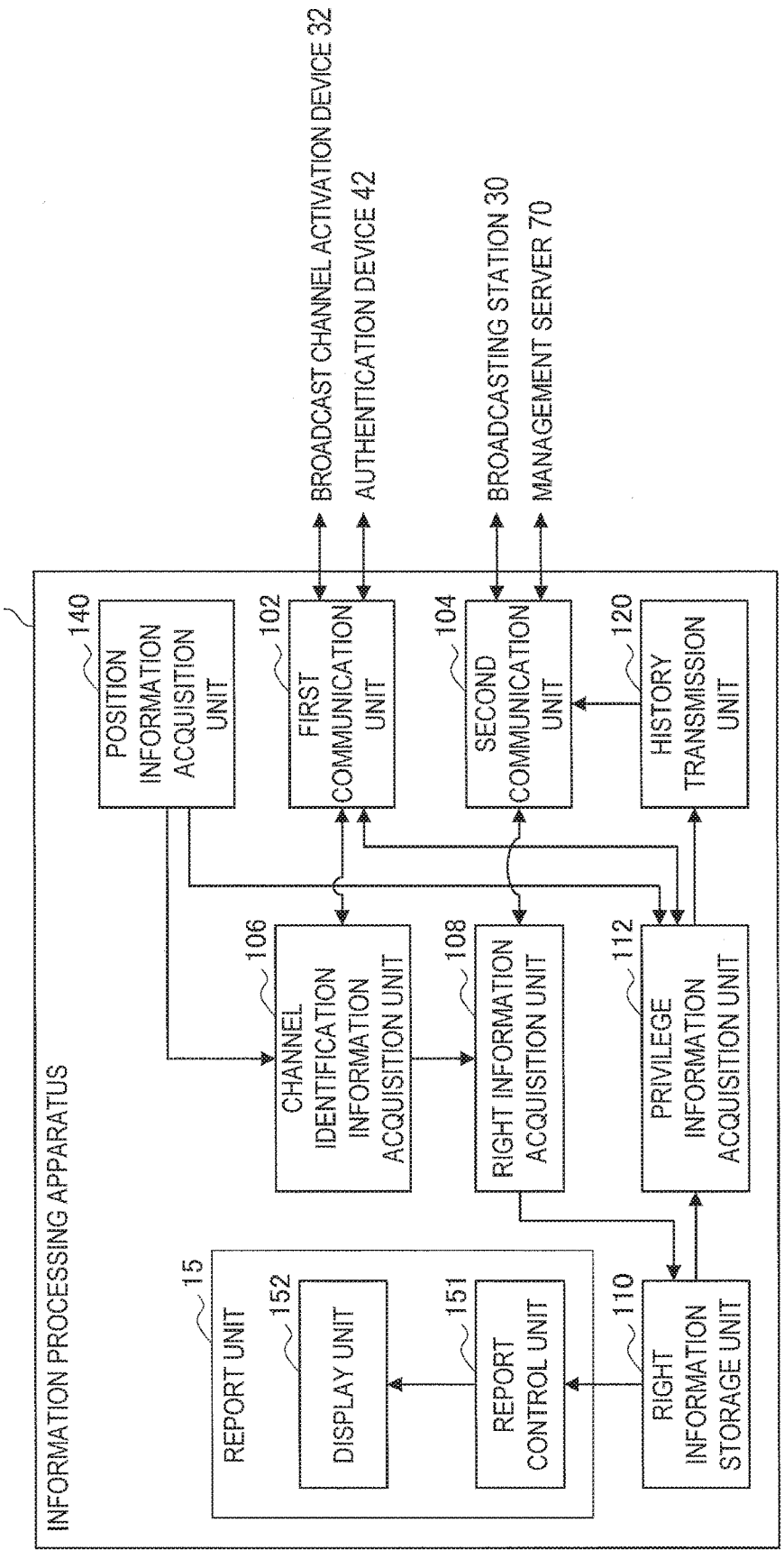

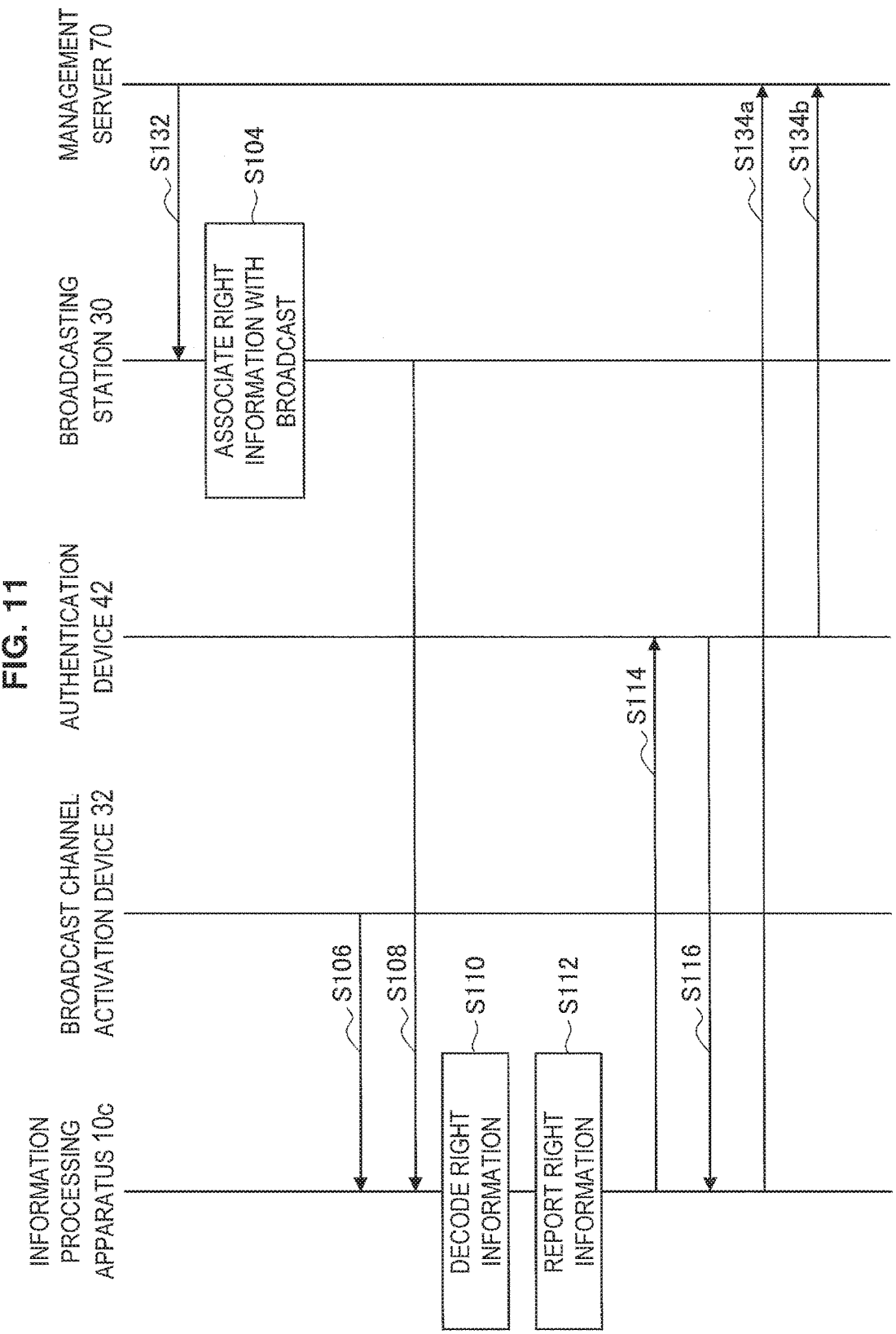

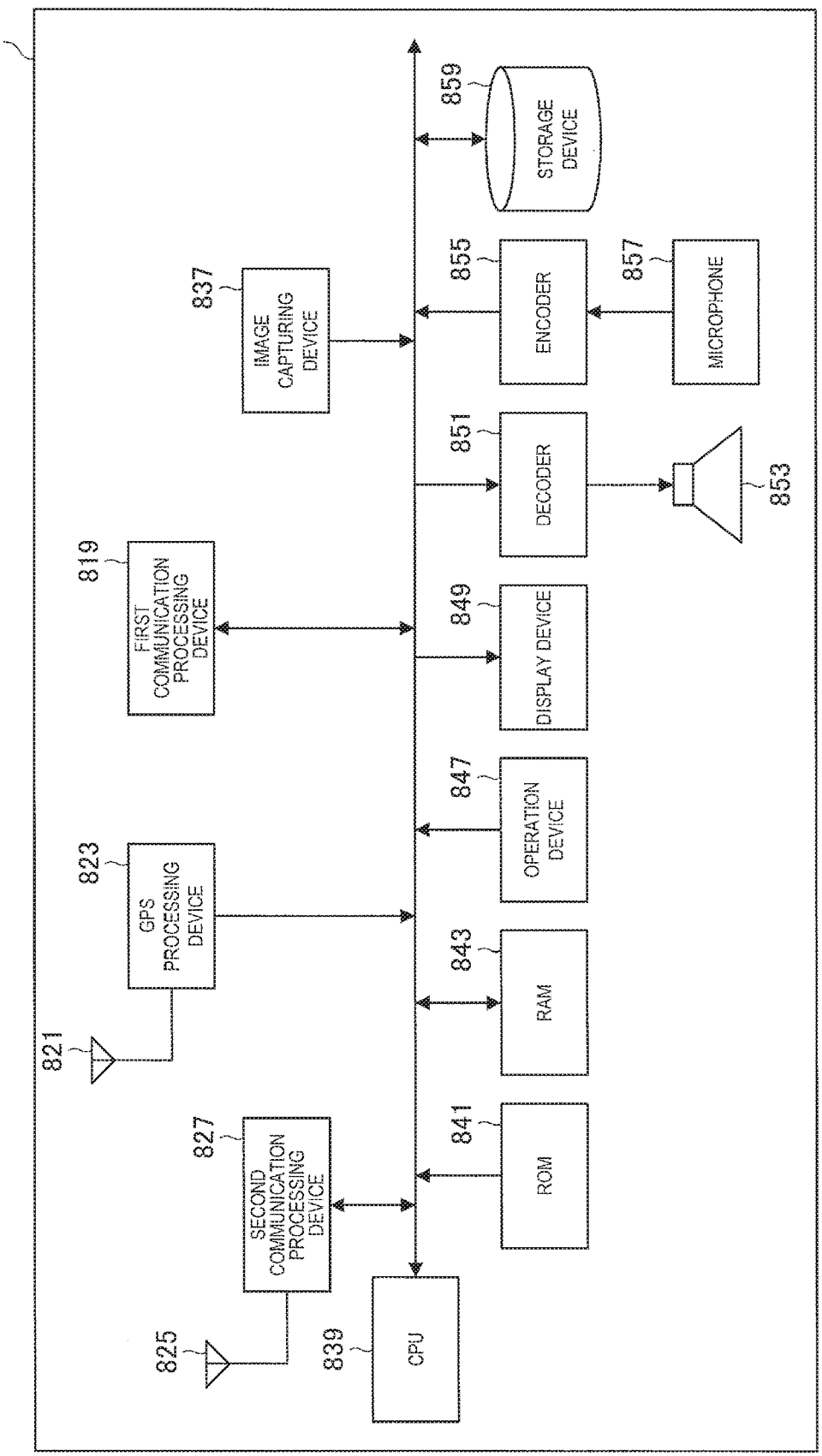

US 10,375,431 B2

INFORMATION PROCESSING APPARATUS AND INFORMATION PROCESSING METHOD TO PROVIDE PRIVILEGE

TECHNICAL FIELD

The present disclosure relates to an information processing apparatus, an information processing method, and a program.

BACKGROUND ART

The data broadcasting technology has been gaining widespread use in recent years, making it possible to not only simply distribute videos, but also provide privileges such as electronic coupons for discount services of predetermined stores.

For example, Patent Literature 1 discloses an example of a communication and broadcast cooperative service providing system capable of recognizing, with the data broadcasting technology, whether or not a user has viewed a specific broadcast, and providing a privilege such as an electronic coupon in accordance with a viewing status of the broadcast.

CITATION LIST

Patent Literature

Patent Literature 1: JP 2009-38788A

SUMMARY OF INVENTION

Technical Problem

Meanwhile, it is desired to provide a technology of effectively providing a privilege to a user who has viewed a broadcast of advertisement for a specific place (spot such as a store) and has been guided to the place.

Accordingly, the present disclosure offers a novel and improved information processing apparatus, information processing method, and program that can effectively provide a privilege to a user who has viewed a broadcast and has been guided to a predetermined place.

Solution to Problem

According to the present disclosure, there is provided an information processing apparatus including: a channel identification information acquisition unit configured to acquire channel identification information for receiving a broadcast from a first object; a right information acquisition unit configured to acquire right information for acquiring a privilege, the right information being associated with the broadcast indicated by the channel identification information; and a privilege information acquisition unit configured to establish communication with a second object installed in a predetermined place different from a place of the first object, to execute a process for authentication based on the right information through the communication, and to acquire privilege information indicating the privilege, the privilege information being based on a result of the authentication.

In addition, according to the present disclosure, there is provided an information processing method including: acquiring, from a first object that stores channel identification information for receiving a broadcast, the channel identification information; acquiring right information for acquiring a privilege, the right information being associated with the broadcast received on the basis of the channel identification information; and establishing communication with a second object installed in a predetermined place different from a place of the first object, executing a process for authentication based on the right information through the communication, and acquiring privilege information for acquiring the privilege, the privilege information being based on a result of the authentication.

Furthermore, according to the present disclosure, there is provided a program for causing a computer to execute: a function of acquiring, from a first object that stores channel identification information for receiving a broadcast, the channel identification information; a function of acquiring right information for acquiring a privilege, the right information being associated with the broadcast received on the basis of the channel identification information; and a function of establishing communication with a second object installed in a predetermined place different from a place of the first object, executing a process for authentication based on the right information through the communication, and acquiring privilege information for acquiring the privilege, the privilege information being based on a result of the authentication.

Advantageous Effects of Invention

According to the present disclosure as described above, there is provided an information processing apparatus, an information processing method, and a program that can effectively provide a privilege to a user who has viewed a broadcast and has been guided to a predetermined place.

Note that the advantageous effects described above are not necessarily limited, but any advantageous effects that are shown in the present specification or any other advantageous effects that can be grasped from the present specification may be attained in combination of the above-described advantageous effects or instead thereof.

BRIEF DESCRIPTION OF DRAWINGS

FIG. 10 is a block diagram illustrating another instance of the information processing apparatus according to the embodiment.

FIG. 11 is a sequence diagram illustrating a flow of a series of processes of the information processing system according to the embodiment.

FIG. 12 is an example of a hardware configuration of an information processing apparatus according to an embodiment of the present disclosure.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Now, the description will be made in the following order.
1. First Embodiment
   1.1. System Configuration
   1.2. Configuration of Information Processing Apparatus
   1.3. Processes
   1.4. Conclusion
2. Second Embodiment
   2.1. System Configuration
   2.2. Configuration of Information Processing Apparatus
   2.3. Processes
   2.4. Modification 1
   2.5. Modification 2
   2.6. Conclusion
3. Third Embodiment
   3.1. System Configuration
   3.2. Configuration of Information Processing Apparatus
   3.3. Processes
   3.4. Conclusion
4. Hardware Configuration

1. First Embodiment

1.1. System Configuration

Figure 1:
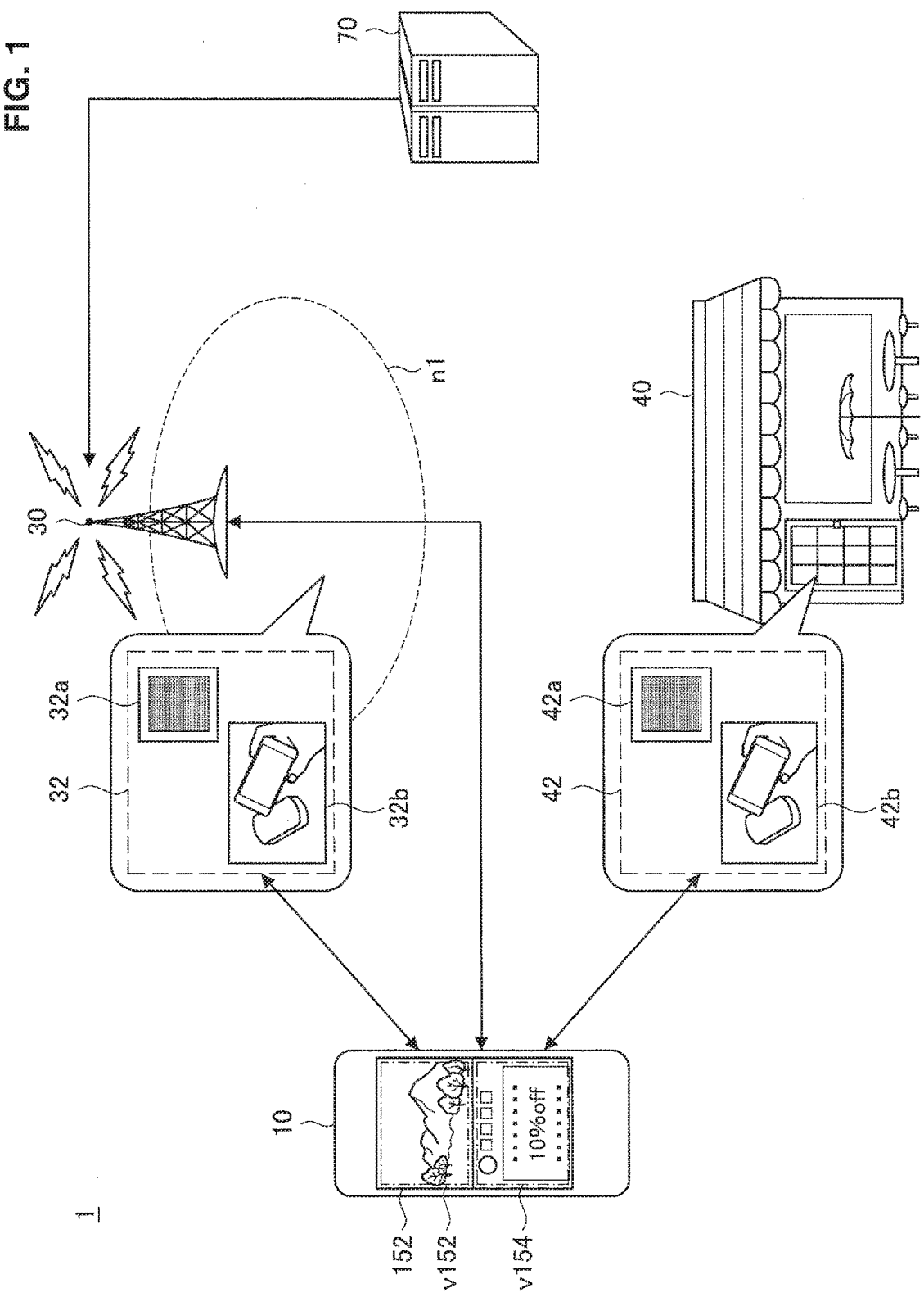
FIG. 1 is a diagram illustrating a schematic system configuration of an information processing system according to a first embodiment of the present disclosure.

First of all, a schematic configuration of an information processing system according to a first embodiment of the present disclosure will be described with reference to FIG. 1. FIG. 1 is a diagram illustrating a schematic system configuration of an information processing system 1 according to the present embodiment.

As illustrated in FIG. 1, the information processing system 1 according to the present embodiment includes an information processing apparatus 10, a management server 70, a broadcasting station 30, a broadcast channel activation device 32, and an authentication device 42.

The broadcasting station 30 acquires audio data and video data including image (still image or moving image) data from a video distribution server that is not illustrated, and distributes the acquired video data to the information processing apparatus 10 positioned in a predefined area n1 as a broadcast. The broadcasting station 30 may distribute the acquired video data to the information processing apparatus 10 positioned in the area n1, for example, via mobile digital terrestrial broadcasting (1 seg: one-segment broadcasting) or a cellular wireless communication network. The broadcasting station 30 may also distribute different broadcasts separately in different frequency bands (physical channels, which will be referred to simply as "channels"). The above describes an example in which video data is distributed as a broadcast, but the broadcasting station 30 may distribute audio data as a broadcast in addition to video data. Additionally, the term "broadcast" will refer to content itself distributed from the broadcasting station 30.

The broadcasting station 30 associates at least a part of broadcasts to be distributed with content different from the broadcast as a data broadcast, and distributes the broadcast and the content. The broadcasting station 30 may use a data broadcasting page description language such as Broadcast Markup Language (BML) to associate the content with the broadcast to be distributed.

The information processing system 1 according to the present embodiment uses a data broadcast distributed from the broadcasting station 30 to distribute content for receiving a privilege in a predetermined stop (such as a store) 40, thereby providing a mechanism of guiding a user to the spot and confirming that the user has been guided to the spot.

Additionally, the "privilege" in the present embodiment is a generic term chiefly for incentives offered to consumers or the like as a commercially promotional means. Specifically, the privilege includes a point service, a coupon, and the like. In general, "point services" include a service in which users acquire points, for example, in accordance with paid money and use statuses, and receive benefits such as gifts and discounts in exchange for some of the points. Examples of point services include mileage. "Mileage" is a kind of point service, and offers a variety of benefits in accordance with a use level of a predetermined service (such as airlines). "Coupons" include a service in which users can receive benefits such as gifts and discounts in exchange for coupon tickets printed on paper or displayed on screens.

The following describes the information processing system 1 according to the present embodiment in detail. Let us assume below that content (which will also be referred to as "right information") for receiving a privilege in the spot (store) 40 is associated with a broadcast of advertisement for the spot 40 as a data broadcast on the basis of a request from an advertiser of the spot 40. Note that the broadcasting station 30 distributes the broadcast of advertisement, with which the right information is associated, within the area n1 via a channel c10.

Additionally, the "right information" in the present embodiment indicates a right to receive a privilege, and is provided by executing a specific process such as acquiring specific information in a specific place like the broadcast channel activation device 32 discussed below and viewing a specific broadcast. The right information is used, for example, as input information on authentication for receiving a privilege in a specific place like the authentication device 42 discussed below. The right information may thus include, for example, an ID for authentication. The right information does not function by itself to help a user acquire a privilege. As a specific example, the right information itself does not serve as a coupon. Additionally, the right information may include information on a privilege to be acquired in exchange for the right information. Examples of information on a privilege include information on a spot at which a privilege can be acquired and information indicating the content of the acquired privilege.

The management server 70 transmits the right information for receiving a privilege to the broadcasting station 30, and instructs the broadcasting station 30 to associate the right information as a data broadcast with a broadcast (such as a broadcast of advertisement for the spot 40) to be distributed via the channel c10.

Additionally, the management server 70 itself may generate right information on the basis of a request from an advertiser, or externally acquire right information generated in advance.

Once the broadcasting station 30 is instructed by the management server 70, the broadcasting station 30 associates the acquired right information as a data broadcast with a broadcast designated by the management server 70, and distributes the broadcast and the data broadcast within the area n1. The broadcasting station 30 may then encode the right information on the basis of key information for encoding generated in advance, and associate the encoded right information as a data broadcast with a broadcast designated by the management server 70. Let us assume below that the encoded right information is associated as a data broadcast with a broadcast designated by the management server 70.

The broadcast channel activation device 32 is a structural element for reporting, to the information processing apparatus 10 discussed below, channel identification information for receiving a broadcast corresponding to a predetermined channel (such as the channel c10) among broadcasts distributed from the broadcasting station 30. The channel identification information includes, for example, information indicating the channel c10 for receiving a broadcast. As a specific example, the channel identification information may include information on a frequency band corresponding to the channel c10. The broadcast channel activation device 32 is installed within the area n1. The broadcast channel activation device 32 is then recommended to be installed within the area n1 in a manner that the area n1 encompasses a range within which the broadcast channel activation device 32 and the information processing apparatus 10 can transmit and receive information. Note that the broadcast channel activation device 32 corresponds to an example of a "first object".

The information processing apparatus 10 acquires the channel identification information from the broadcast channel activation device 32, so that the information processing apparatus 10 can receive a broadcast corresponding to the acquired channel identification information. This allows a user of the information processing apparatus 10 to view, via the information processing apparatus 10, the broadcast corresponding to the channel identification information reported from the broadcast channel activation device 32.

The broadcast channel activation device 32 may include a communication device for reporting, to the information processing apparatus 10, channel identification information stored in a predetermined storage apparatus. The broadcast channel activation device 32 may include a communication device that uses a wireless communication technology such as the near filed communication (NFC) technology and the radio frequency identification technology. Examples of communication devices that use a wireless communication technology such as the NFC communication technology and the RFID technology include an NFC tag 32a and an NFC reader and writer 32b.

The NFC tag 32a receives a high frequency signal from an external device (the information processing apparatus 10 will serve below as this external device) via a connected antenna, and acquires information from the information processing apparatus 10 by decoding the received high frequency signal. In addition, the NFC tag 32a controls load modulation on the basis of the information acquired by decoding a high frequency signal to generate a high frequency signal for responding to the information processing apparatus 10, and transmits the generated high frequency signal to the information processing apparatus 10 via the antenna. Configured in this way, the NFC tag 32a establishes communication with the information processing apparatus 10, and outputs the channel identification information stored in the predetermined storage apparatus to the information processing apparatus 10.

Meanwhile, the NFC reader and writer 32b includes, for example, a high frequency signal generation unit 321, a demodulation unit 322 and an antenna 323, and serves as a reader/writer (or interrogator) for NFC and the like.

The high frequency signal generation unit 321 receives, from a predetermined control unit, a high frequency signal generation command indicating that a high frequency signal begins to be transmitted, and generates a high frequency signal according to the high frequency signal generation command. In addition, the high frequency signal generation unit receives, for example, from the control unit, a high frequency signal transmission stop command indicating that a high frequency signal is stopped from being transmitted, and stops generating a high frequency signal.

The demodulation unit 322 detects the envelope of a change in the voltage amplitude, for example, between the high frequency signal generation unit 321 and the antenna 323, and demodulates a signal (more specifically, a signal transmitted through load modulation, for example) transmitted from an external device by binarizing the detected signal. The demodulation unit 322 then sends the demodulated response signal (such as a response signal indicating a response based on a process according to a high frequency signal) to the information processing apparatus 10. A demodulation means of the demodulation unit 322 for demodulating a response signal is not limited thereto, but the demodulation unit 322 can also demodulate a response signal, for example, by using a change in the voltage phase between the high frequency signal generation unit 321 and the antenna 323.

Configured in this way, the NFC reader and writer 32b establishes communication with the information processing apparatus 10, and outputs the channel identification information stored in the predetermined storage apparatus to the information processing apparatus 10.

A structural element for reporting channel identification information from the broadcast channel activation device 32 to the information processing apparatus 10 is not limited to a communication device such as the NFC tag 32a and the NFC reader and writer 32b, which uses a wireless communication technology such as the NFC communication technology and the RFID technology. As a specific example, channel identification information may be reported from the broadcast channel activation device 32 to the information processing apparatus 10 by a wireless communication technology defined by the IEEE 802.15 standard or the IEEE 802.11 standard. As a specific example, wireless communication technologies defined by the IEEE 802.15 standard include Bluetooth (registered trademark). Meanwhile, as a specific example, wireless communication technologies defined by the IEEE 802.11 standard include wireless fidelity (Wi-fi) (registered trademark). In addition to wireless communication, visible light communication, infrared communication, or communication established via sounds may also be used.

As another example, the broadcast channel activation device 32 may be configured as a two-dimensional code such as a QR Code (registered trademark) indicating channel identification information, or three-dimensional code. In this case, the information processing apparatus 10 captures an image of a two-dimensional code, for example, with a built-in image capturing unit or an image capturing unit operating in cooperation therewith, and then analyzes the captured image of the two-dimensional code to acquire channel identification information.

Let us assume below that the broadcast channel activation device 32 uses a wireless communication technology such as the NFC communication technology and the RFID technology to establish communication with the information processing apparatus 10, and reports information (such as channel identification information) to the information processing apparatus 10.

The broadcast channel activation device 32 may also report information other than channel identification information to the information processing apparatus 10 as information for receiving a broadcast. For example, the broadcast channel activation device 32 may report, to the information processing apparatus 10, key information for decoding a data broadcast associated with a broadcast indicated by channel identification information.

If the key information for decoding a data broadcast is reported from the broadcast channel activation device 32 to the information processing apparatus 10 in this way, it is possible to impose restrictions in a manner that the data broadcast can be decoded by only the information processing apparatus 10 that has acquired the channel identification information from the broadcast channel activation device 32. That is to say, only a user who has accessed the broadcast channel activation device 32 (i.e. user who has visited the place where the broadcast channel activation device 32 is installed) can acquire right information distributed as a data broadcast, and it is possible to guide the user to the broadcast channel activation device 32.

Additionally, the information processing apparatus 10 may decode a data broadcast with the key information acquired from the broadcast channel activation device 32, for example, in association with a specific process such as viewing a broadcast corresponding to the channel identification information. This configuration makes it possible, for example, to provide right information distributed as a data broadcast to only a user who has visited the place where the broadcast channel activation device 32 is installed and viewed a broadcast (such as a broadcast of advertisement) corresponding to the channel identification information reported from the broadcast channel activation device 32.

In addition, the broadcast channel activation device 32 may report, to the information processing apparatus 10, identification information (which will also be referred to "object identification information") for identifying the broadcast channel activation device 32 itself. The object identification information may include, for example, an ID for uniquely specifying the broadcast channel activation device 32. The object identification information reported in this way can be used as information for recognizing where the broadcast channel activation device 32 accessed by the information processing apparatus 10 to acquire channel identification information is installed.

The broadcast channel activation device 32 may also report, to the information processing apparatus 10, information indicating an acquisition source of an application for viewing a broadcast. Examples of information indicating the acquisition source include the URL of a website where it is possible to download an application. For example, even when an application for viewing a broadcast is not installed on the information processing apparatus 10, this configuration can guide a user who is operating the information processing apparatus 10 to a procedure of installing the application.

The information processing apparatus 10 accesses the broadcast channel activation device 32 installed within the area n1 where a broadcast from the broadcasting station 30 is distributed, thereby acquiring channel identification information for receiving a broadcast corresponding to a predetermined channel from the broadcast channel activation device 32.

The information processing apparatus 10 may then acquire, from the broadcast channel activation device 32, key information for decoding a data broadcast associated with a broadcast indicated by the channel identification information. Similarly, the information processing apparatus 10 may acquire, from the broadcast channel activation device 32, object identification information for identifying the accessed broadcast channel activation device 32 and information indicating an acquisition source of an application for viewing a broadcast. Let us assume below that the information processing apparatus 10 acquires channel identification information, key information, object identification information, and information indicating an acquisition source of an application from the broadcast channel activation device 32.

The information processing apparatus 10 receives a broadcast distributed via the channel c10 indicated by the acquired channel identification information among broadcasts distributed from the broadcasting station 30 on the basis of the channel identification information, and reproduces the received broadcast to allow a user to view the reproduced broadcast. When no application for reproducing the received broadcast (i.e. allowing a user to view the broadcast) has been installed on the information processing apparatus 10, the information processing apparatus 10 may acquire and install the application on the basis of the acquired information indicating an acquisition source of the application.

The information processing apparatus 10 acquires right information associated with the received broadcast as a data broadcast. If the data broadcast (i.e. right information) has been encoded, the information processing apparatus 10 may decode the data broadcast with the key information acquired from the broadcast channel activation device 32. The information processing apparatus 10 may also decode the data broadcast in accordance with a viewing status of the received broadcast (for example, when the broadcast is viewed). Needless to say, if the data broadcast has not been encoded, the information processing apparatus 10 does not have to execute a decoding process.

The information processing apparatus 10 acquires right information for acquiring a privilege in this way.

When the acquired right information includes information on a privilege acquired in exchange for the right information, the information processing apparatus 10 may report the information on the privilege in a manner that a user can identify the information on the privilege.

For example, the information processing apparatus 10 uses a display unit 152 (such as a display) of the information processing apparatus 10 as a medium for reporting information on a privilege in the example illustrated in FIG. 1. Specifically, the information processing apparatus 10 displays a video v152 received as a broadcast on the display unit 152, and also displays information v154 on a privilege included in right information associated with the broadcast on the display unit 152. This allows a user to recognize information on the spot 40 where the privilege is available and the content of the privilege with the information v154 on the privilege displayed on the display unit 152.

If the information processing apparatus 10 acquires right information, and then accesses the predefined authentication device 42, authentication is performed between the information processing apparatus 10 and the authentication device 42 with the right information as input information. Accordingly, the information processing apparatus 10 acquires privilege information on a privilege corresponding to the right information.

Additionally, the "privilege information" in the present embodiment includes information indicating a privilege such as a point service and mileage, and information serving as a medium for receiving a substantial privilege such as a discount like a coupon.

The authentication device 42 is a structural element for providing the information processing apparatus 10 that has acquired right information with privilege information corresponding to the right information. The authentication device 42 is recommended to be disposed at the spot 40 to which a user is guided. Examples of the spot 40 to which a user is guided include a store and an event venue where a privilege such as a discount indicated by right information is provided. Note that the authentication device 42 corresponds to an example of a "second object". The spot 40 where the authentication device 42 is disposed corresponds to an example of a "predetermined place different from the place of the first object".

The authentication device 42 is configured to be capable of reading out privilege information associated with predetermined right information in advance from a predetermined storage apparatus. Information associated with the privilege information can be, for example, right information itself, or identification information for identifying the right information as long as the information associated with the privilege information can identify the right information.

The authentication device 42 establishes communication with the information processing apparatus 10 when accessed by the information processing apparatus 10, and then acquires right information from the information processing apparatus 10 through the communication. The authentication device 42 performs authentication on whether or not the acquired right information agrees with right information associated with privilege information that can be read out by the authentication device 42. If the authentication results in success, the authentication device 42 reads out the privilege information corresponding to the right information acquired from the information processing apparatus 10, and provides the privilege information to the information processing apparatus 10 through the established communication.

Additionally, the authentication device 42 includes a communication device for transmitting and receiving data (such as right information and privilege information) to and from the information processing apparatus 10. For example, the authentication device 42 may include a communication device that uses a wireless communication technology such as the NFC communication technology and the RFID technology. Examples of communication devices that use a wireless communication technology such as the NFC communication technology and the RFID technology include an NFC tag 42*a* and an NFC reader and writer 42*b*. Additionally, the NFC tag 42*a* and the NFC reader and writer 42*b* are configured in the same way as the NFC tag 32*a* and the NFC reader and writer 32*b*, so that they will not be described in detail.

A structural element used by the authentication device 42 to transmit and receive data to and from the information processing apparatus 10 is not limited to the a communication device such as the NFC tag 42*a* and the NFC reader and writer 42*b* that uses a wireless communication technology such as the NFC communication technology and the RFID technology. As a specific example, a wireless communication technology such as Bluetooth (registered trademark) and Wi-fi (registered trademark) may be used. In addition to wireless communication, visible light communication, infrared communication, or communication established via sounds may also be used.

It has been described in the example above that the authentication device 42 acquires right information from the information processing apparatus 10 and performs authentication on the basis of the acquired right information, but the information processing apparatus 10 may execute a process for authentication. In this case, for example, the authentication device 42 may report, to the information processing apparatus 10, the right information (or information for identifying the right information) associated with privilege information that can be read out by the authentication device 42. The information processing apparatus 10 performs authentication on the basis of whether or not the right information reported from the authentication device 42 agrees with right information stored by the information processing apparatus 10. If so, the information processing apparatus 10 reports privilege information corresponding to the reported right information to the authentication device 42. The above is merely an example. Any type of information can be used for authentication, any device can perform authentication, and authentication can be performed in any method as long as it is possible to confirm whether or not the authentication device 42 can provide the privilege information corresponding to the right information presented from the information processing apparatus 10.

In addition, the authentication device 42 may acquire, from the information processing apparatus 10, object identification information on the broadcast channel activation device 32 accessed by the information processing apparatus 10 to acquire channel identification information. Configured in this way, for example, the authentication device 42 can confirm which broadcast channel activation device 32 the information processing apparatus 10 that has accessed the authentication device 42 to acquire privilege information accesses to view a broadcast and acquire right information. In other words, those who install the authentication device 42 (i.e. advertisers who provide privileges) can recognize which broadcast channel activation device 32 a user of the information processing apparatus 10 has accessed to receive a broadcast of the advertisement and to be guided to the authentication device 42.

It has been described in the example above that a data broadcast (i.e. right information) is encoded, but a broadcast itself distributed from the broadcasting station 30 may be encoded in addition to a data broadcast and decoded on the basis of key information reported from the broadcast channel activation device 32. This configuration allows only the information processing apparatus 10 that has accessed the broadcast channel activation device 32 to decode and view the distributed broadcast. That is to say, only a user who has accessed the broadcast channel activation device 32 can view a broadcast, and it is possible to distribute a broadcast to only a user who has visited the place where the broadcast channel activation device 32 is installed.

In addition, the broadcast channel activation device 32 may acquire information on a user of the information processing apparatus 10 (e.g. age, sex, and family structure) from the information processing apparatus 10, and switch channel identification information to be reported to the information processing apparatus 10 in accordance with the acquired information.

As a specific example, the broadcast channel activation device 32 may report, to the information processing apparatus 10, channel identification information for receiving a broadcast for women when a user of the information processing apparatus 10 is a woman. In this case, it is needless to say that the broadcasting station 30 distributes a broadcast for women via a channel indicated by the channel identification information. The management server 70 may associate right information for providing a privilege targeting women with the broadcast for women as a data broadcast. This configuration makes it possible to narrow down targets to whom a privilege is provided and provide a privilege according to a demand of the targets.

The broadcast channel activation device 32 can switch channel identification information to be reported to the information processing apparatus 10 in accordance with information on a user, so that it is possible, for example, to impose a view restriction in accordance with the age of users and to prevent the users from viewing a part of broadcasts.

Similarly, the authentication device 42 may acquire information on a user of the information processing apparatus 10 from the information processing apparatus 10, and switch privilege information to be reported to the information processing apparatus 10 in accordance with the acquired information.

As a specific example, the authentication device 42 may report, to the information processing apparatus 10, privilege information corresponding to a privilege for women when a user of the information processing apparatus 10 is a woman. This configuration makes it possible to provide a privilege according to a demand of the targets in accordance with targets to whom a privilege is provided.

1.2. Configuration of Information Processing Apparatus

Figure 2:
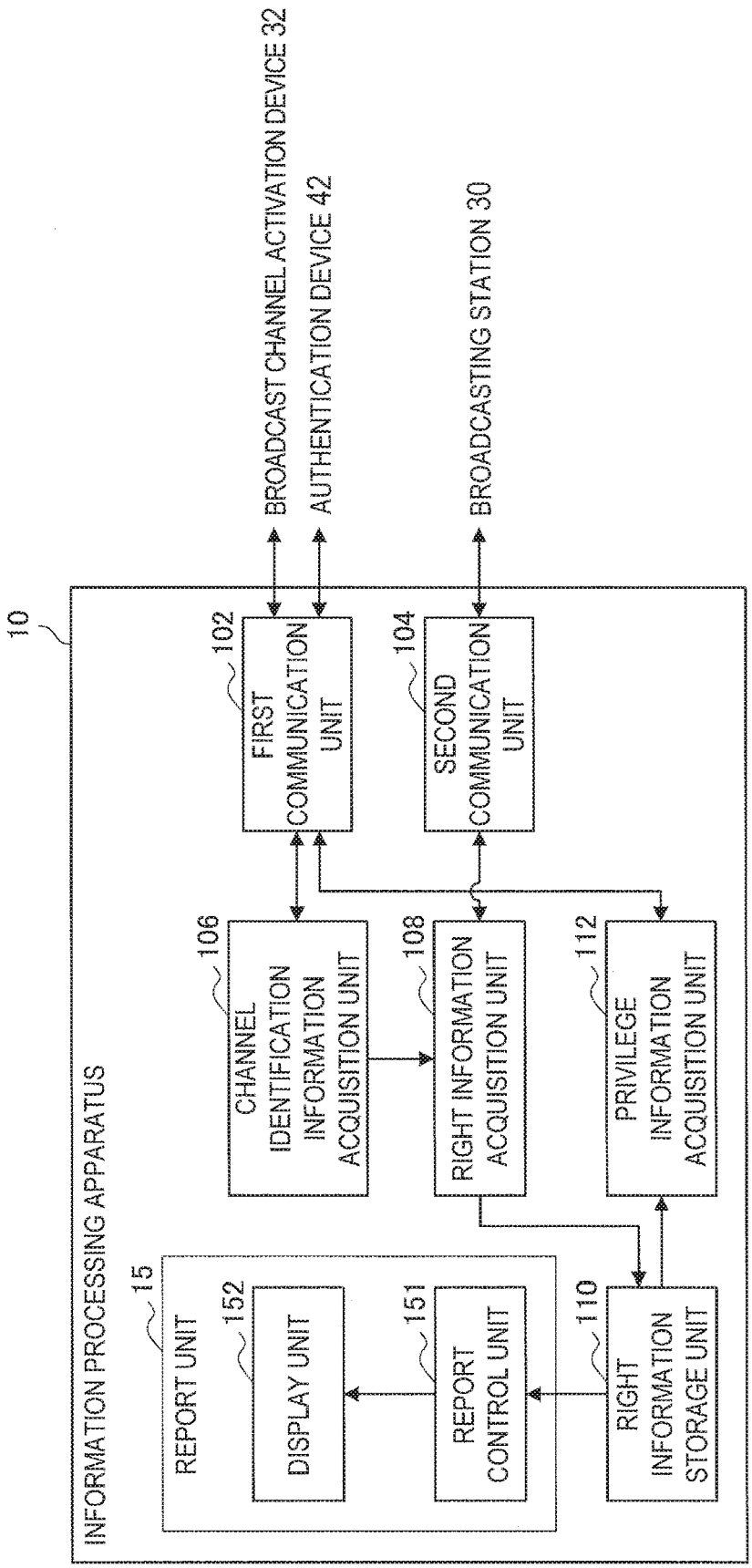
FIG. 2 is a block diagram illustrating a configuration of an information processing apparatus according to the embodiment.

Next, the configuration of the information processing apparatus 10 according to the present embodiment will be described with reference to FIG. 2. FIG. 2 is a block diagram illustrating the configuration of the information processing apparatus 10 according to the present embodiment. As illustrated in FIG. 2, the information processing apparatus 10 includes a first communication unit 102, a second communication unit 104, a channel identification information acquisition unit 106, a right information acquisition unit 108, a right information storage unit 110, a report unit 15, and a privilege information acquisition unit 112. Let us assume below that the information processing apparatus 10 accesses the broadcast channel activation device 32 and the authentication device 42 via the first communication unit 102, and receives a broadcast distributed from the broadcasting station 30 via the second communication unit 104.

The first communication unit 102 establishes communication with the broadcast channel activation device 32 and the authentication device 42 for each structural element in the information processing apparatus 10, and transmits and receives data through the communication. The first communication unit 102 may be configured as a communication device that uses a wireless communication technology such as the NFC communication technology and the RFID technology.

Additionally, the information processing apparatus 10 does not necessarily have to use the same communication technology to access the broadcast channel activation device 32 and the authentication device 42. For example, the information processing apparatus 10 may use a wireless communication technology such as the NFC communication technology and the RFID technology to access one of the broadcast channel activation device 32 and the authentication device 42, and then use a different communication technology to access the other device. In this case, the information processing apparatus 10 may include different first communication units 102 (communication devices) for accessing the broadcast channel activation device 32 and the authentication device 42. If the first communication device 102 can establish communication based on different communication technologies (e.g. a plurality of communication devices can be configured as a single chip), the information processing apparatus 10 does not necessarily have to include a plurality of first communication devices 102.

Even if it is not specifically described, let us assume below that each structural element in the information processing apparatus 10 transmits and receives data to and from the broadcast channel activation device 32 and the authentication device 42 via the first communication unit 102.

The second communication unit 104 receives a broadcast distributed from the broadcasting station 30 for the information processing apparatus 10. The second communication device 104 may be configured as a communication device for receiving a broadcast, for example, via a mobile digital terrestrial broadcasting (1 seg) or a cellular wireless communication network. Additionally, the second communication unit 104 may be integrated with the first communication unit 102 (as a single chip).

Even if it is not specifically described, let us assume below that each structural element in the information processing apparatus 10 receives a broadcast from the broadcasting station 30 via the second communication unit 104.

The channel identification information acquisition unit 106 establishes communication with the broadcast channel activation device 32 when the information processing apparatus 10 accesses the broadcast channel activation device 32. Once the channel identification information acquisition unit 106 establishes communication with the broadcast channel activation device 32, the channel identification information acquisition unit 106 acquires channel identification information from the broadcast channel activation device 32 through the communication.

The channel identification information acquisition unit 106 may then acquire, from the broadcast channel activation device 32, key information for decoding a data broadcast associated with a broadcast indicated by the channel identification information. Similarly, the channel identification information acquisition unit 106 may acquire, from the broadcast channel activation device 32, object identification information for identifying the accessed broadcast channel activation device 32 and information indicating an acquisition source of an application for viewing a broadcast. Let us assume below that the channel identification information acquisition unit 106 acquires channel identification information, key information, object identification information, and information indicating an acquisition source of an application from the broadcast channel activation device 32.

The channel identification information acquisition unit 106 outputs the acquired channel identification information, key information, object identification information, and information indicating an acquisition source of an application to the right information acquisition unit 108.

The right information acquisition unit 108 acquires the channel identification information, the key information, the object identification information, and the information indicating an acquisition source of an application from the channel identification information acquisition unit 106.

The right information acquisition unit 108 receives a broadcast distributed via the channel c10 indicated by the channel identification information among broadcasts distributed from the broadcasting station 30 on the basis of the acquired channel identification information. The right information acquisition unit 108 causes an application (not illustrated) for reproducing a broadcast to reproduce the received broadcast. When no application for reproducing the received broadcast (i.e. allowing a user to view the broadcast) has been installed, the right information acquisition unit 108 may acquire and install the application on the information processing apparatus 10 on the basis of the acquired information indicating an acquisition source of the application.

The right information acquisition unit 108 acquires right information associated with the received broadcast as a data broadcast. If the data broadcast (i.e. right information) has been encoded, the information processing apparatus 10 may decode the data broadcast with the key information acquired from the broadcast channel activation device 32. The information processing apparatus 10 may also decode the data broadcast in accordance with a viewing status of the received broadcast (for example, when the broadcast is viewed).

The right information acquisition unit 108 causes the right information storage unit 110 to store the right information distributed by using the data broadcast in association with the acquired object identification information. The right information storage unit 110 is a storage unit for storing right information.

The report unit 15 is a structural element for reporting information on a privilege in a manner that a user can identify the information on the privilege when the information on the privilege is included in right information. For example, the example illustrated in FIG. 2 shows that the report unit 15 displays information on a privilege included in right information as video information. In this case, the report unit 15 includes a report control unit 151 and a display unit 152.

The report control unit 151 reads out the acquired right information from the right information storage unit 110. The report control unit 151 extracts information on a privilege from the read-out right information, and then displays the extracted information on the privilege on the display unit 152.

Note that the display unit 152 does not necessarily have to be provided as a structural element dedicated to the report unit 15. For example, a display of the information processing apparatus 10 may be used as the display unit 152.

The example illustrated in FIG. 2 shows that information on a privilege is displayed as video information, but the information on the privilege may be reported in any method as long as a user can identify the information on the privilege. For example, the report unit 15 may report information on a privilege to a user via a sound.

The privilege information acquisition unit 112 establishes communication with the authentication device 42 when the information processing apparatus 10 accesses the authentication device 42. Once the privilege information acquisition unit 112 establishes communication with the authentication device 42, the privilege information acquisition unit 112 reads out right information from the right information storage unit 110 and reports the read-out right information to the authentication device 42 through the established communication.

The privilege information acquisition unit 112 may then report, to the authentication device 42, object identification information that is associated with the right information and indicates the broadcast channel activation device 32 together. This allows the authentication device 42 to confirm which broadcast channel activation device 32 the information processing apparatus 10 that has accessed the authentication device 42 to acquire privilege information accesses to view a broadcast and acquire right information.

The privilege information acquisition unit 112 acquires privilege information from the authentication device 42 as a response to the right information. That is to say, a user of the information processing apparatus 10 can acquire a privilege on the basis of the acquired privilege information.

1.3. Processes

Figure 3:
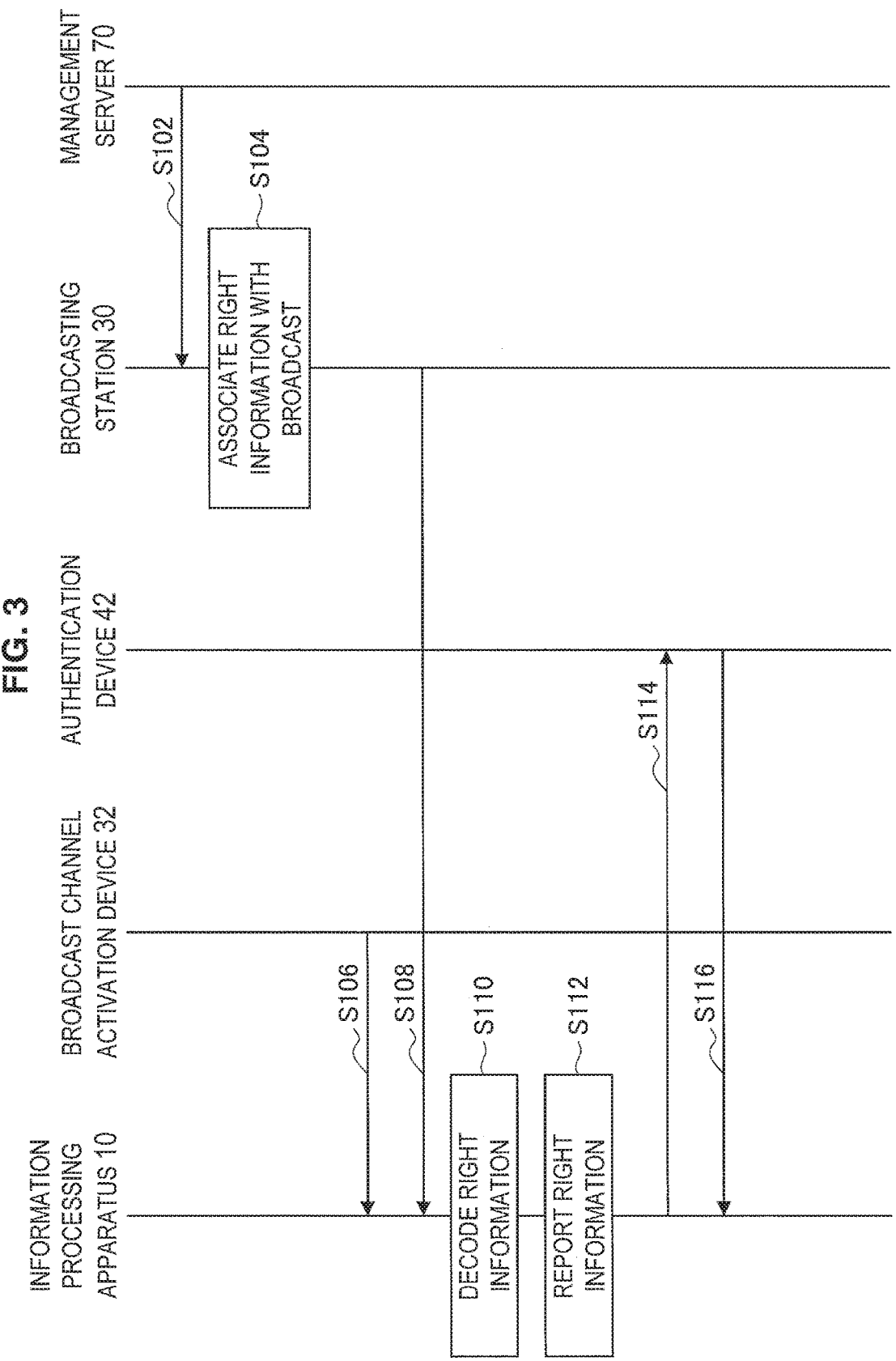
FIG. 3 is a sequence diagram illustrating a flow of a series of processes of the information processing system according to the embodiment.

Next, a flow of a series of operations of the information processing system 1 according to the present embodiment will be described with reference to FIG. 3. FIG. 3 is a sequence diagram illustrating a flow of a series of processes of the information processing system 1 according to the present embodiment.

(Step S102)
The management server 70 transmits the right information for receiving a privilege to the broadcasting station 30, and instructs the broadcasting station 30 to associate the right information as a data broadcast with a broadcast (such as a broadcast of advertisement for the spot 40) to be distributed via the channel c10.

(Step S104)
Once the broadcasting station 30 is instructed by the management server 70, the broadcasting station 30 associates the acquired right information as a data broadcast with a broadcast designated by the management server 70, and distributes the broadcast and the data broadcast within the area n1. The broadcasting station 30 may then encode the right information on the basis of key information for encoding generated in advance, and associate the encoded right information as a data broadcast with a broadcast designated by the management server 70. Let us assume below that the encoded right information is associated as a data broadcast with a broadcast designated by the management server 70.

(Step S106)
The information processing apparatus 10 accesses the broadcast channel activation device 32 installed within the area n1 where a broadcast from the broadcasting station 30 is distributed, thereby acquiring channel identification information for receiving a broadcast corresponding to a predetermined channel (i.e. channel c10) from the broadcast channel activation device 32.

Specifically, the channel identification information acquisition unit 106 of the information processing apparatus 10 establishes communication with the broadcast channel activation device 32 when the information processing apparatus 10 accesses the broadcast channel activation device 32. Once the channel identification information acquisition unit 106 establishes communication with the broadcast channel activation device 32, the channel identification information acquisition unit 106 acquires channel identification information from the broadcast channel activation device 32 through the established communication.

The channel identification information acquisition unit 106 then acquires, from the broadcast channel activation device 32, key information for decoding a data broadcast associated with a broadcast indicated by the channel identification information.

In addition, the channel identification information acquisition unit 106 may acquire, from the broadcast channel activation device 32, object identification information for identifying the accessed broadcast channel activation device 32 and information indicating an acquisition source of an application for viewing a broadcast. Let us assume below that the channel identification information acquisition unit 106 acquires channel identification information, key information, object identification information, and information indicating an acquisition source of an application from the broadcast channel activation device 32.

The channel identification information acquisition unit 106 outputs the acquired channel identification information, key information, object identification information, and information indicating an acquisition source of an application to the right information acquisition unit 108.

(Step S108)

The right information acquisition unit 108 acquires the channel identification information, the key information, the object identification information, and the information indicating an acquisition source of an application from the channel identification information acquisition unit 106.

The right information acquisition unit 108 receives a broadcast distributed via the channel c10 indicated by the channel identification information among broadcasts distributed from the broadcasting station 30 on the basis of the acquired channel identification information. The right information acquisition unit 108 causes an application (not illustrated) for reproducing a broadcast to reproduce the received broadcast. When no application for reproducing the received broadcast (i.e. allowing a user to view the broadcast) has been installed, the right information acquisition unit 108 may acquire and install the application on the basis of the acquired information indicating an acquisition source of the application.

(Step S110)

The right information acquisition unit 108 acquires right information associated with the received broadcast as a data broadcast. If the data broadcast (i.e. right information) has been encoded, the information processing apparatus 10 may decode the data broadcast with the key information acquired from the broadcast channel activation device 32. The information processing apparatus 10 may also decode the data broadcast in accordance with a viewing status of the received broadcast (for example, when the broadcast is viewed). The right information acquisition unit 108 acquires right information for acquiring a privilege in this way.

The right information acquisition unit 108 causes the right information storage unit 110 to store the right information distributed by using the data broadcast in association with the acquired object identification information.

(Step S112)

When the acquired right information includes information on a privilege acquired in exchange for the right information, the information processing apparatus 10 may report the information on the privilege in a manner that a user can identify the information on the privilege. As a specific example, the information processing apparatus 10 may use a display unit 152 (such as a display) of the information processing apparatus 10 as a medium for reporting information on a privilege in the example illustrated in FIG. 1. In this case, the information processing apparatus 10 may display a video v152 received as a broadcast on the display unit 152, and also display information v154 on a privilege included in right information associated with the broadcast on the display unit 152. This allows a user to recognize information on the spot 40 where the privilege is available and the content of the privilege with the information v154 on the privilege displayed on the display unit 152.

(Step S114)

If the information processing apparatus 10 acquires right information, and then accesses the predefined authentication device 42, authentication is performed between the information processing apparatus 10 and the authentication device 42 with the right information as input information.

Specifically, the privilege information acquisition unit 112 of the information processing apparatus 10 establishes communication with the authentication device 42 when the information processing apparatus 10 accesses the authentication device 42. Once the privilege information acquisition unit 112 establishes communication with the authentication device 42, the privilege information acquisition unit 112 reads out right information from the right information storage unit 110 and reports the read-out right information to the authentication device 42 through the established communication.

The privilege information acquisition unit 112 may then report, to the authentication device 42, object identification information that is associated with the right information and indicates the broadcast channel activation device 32 together. This allows the authentication device 42 to confirm which broadcast channel activation device 32 the information processing apparatus 10 that has accessed the authentication device 42 to acquire privilege information accesses to view a broadcast and acquire right information.

(Step S116)

The authentication device 42 acquires the right information from the privilege information acquisition unit 112 through the communication established with the privilege information acquisition unit 112 of the information processing apparatus 10. The authentication device 42 performs authentication on whether or not the acquired right information agrees with right information associated with privilege information that can be read out by the authentication device 42. If the authentication results in success, the authentication device 42 reads out the privilege information corresponding to the right information acquired from the privilege information acquisition unit 112, and provides the privilege information to the privilege information acquisition unit 112 through the established communication.

The privilege information acquisition unit 112 acquires privilege information from the authentication device 42 as a response to the right information. That is to say, a user of the information processing apparatus 10 can acquire a privilege on the basis of the acquired privilege information.

1.4. Conclusion

As described above, the information processing apparatus 10 accesses the broadcast channel activation device 32 to acquire right information as a data broadcast, and then accesses the authentication device 42 to acquire privilege information corresponding to the acquired privilege information in the information processing system 1 according to the present embodiment. Configured in this way, the information processing system 1 allows only a user who has visited the place where the broadcast channel activation device 32 is installed to acquire right information distributed as a data broadcast, and it is possible to guide a user to the broadcast channel activation device 32.

Authentication is performed between the information processing apparatus 10 and the authentication device 42 with right information as input information, thereby providing privilege information to the information processing apparatus 10 in the information processing system 1. Accordingly, disposing the authentication device 42 at the spot 40 to which a user is guided makes it possible to guide a user who has accessed the broadcast channel activation device 32 to acquire right information to the spot 40. That is to say, it is possible to effectively provide a privilege to a user who has accessed the broadcast channel activation device 32, viewed a broadcast, and been guided to the spot 40. The information processing apparatus 10 accesses the authentication device 42 to provide privilege information, so that the authentication device 42 can confirm that a user of the information processing apparatus 10 who has viewed a broadcast is guided to the spot 40.

The information processing apparatus 10 reports, to the authentication device 42, the object identification information acquired from the broadcast channel activation device 32, thereby allowing the authentication device 42 to confirm which broadcast channel activation device 32 has been accessed by the information processing apparatus 10. Those who install the authentication device 42 (i.e. advertisers who provide privileges) can recognize which broadcast channel activation device 32 a user of the information processing apparatus 10 has accessed to receive a broadcast of the advertisement and to be guided to the authentication device 42.

2. Second Embodiment

2.1. System Configuration

Next, an information processing system 1a according to a second embodiment will be described. It has been described that the authentication device 42 manages privilege information to be provided to the information processing apparatus 10 in the information processing system 1 according to the first embodiment. Meanwhile, the information processing system 1a according to the present embodiment is different from the information processing system 1 according to the first embodiment in that it is the management server 70 which manages privilege information to be provided to an information processing apparatus 10a. The following describes the information processing system 1a according to the present embodiment.

Figure 4:
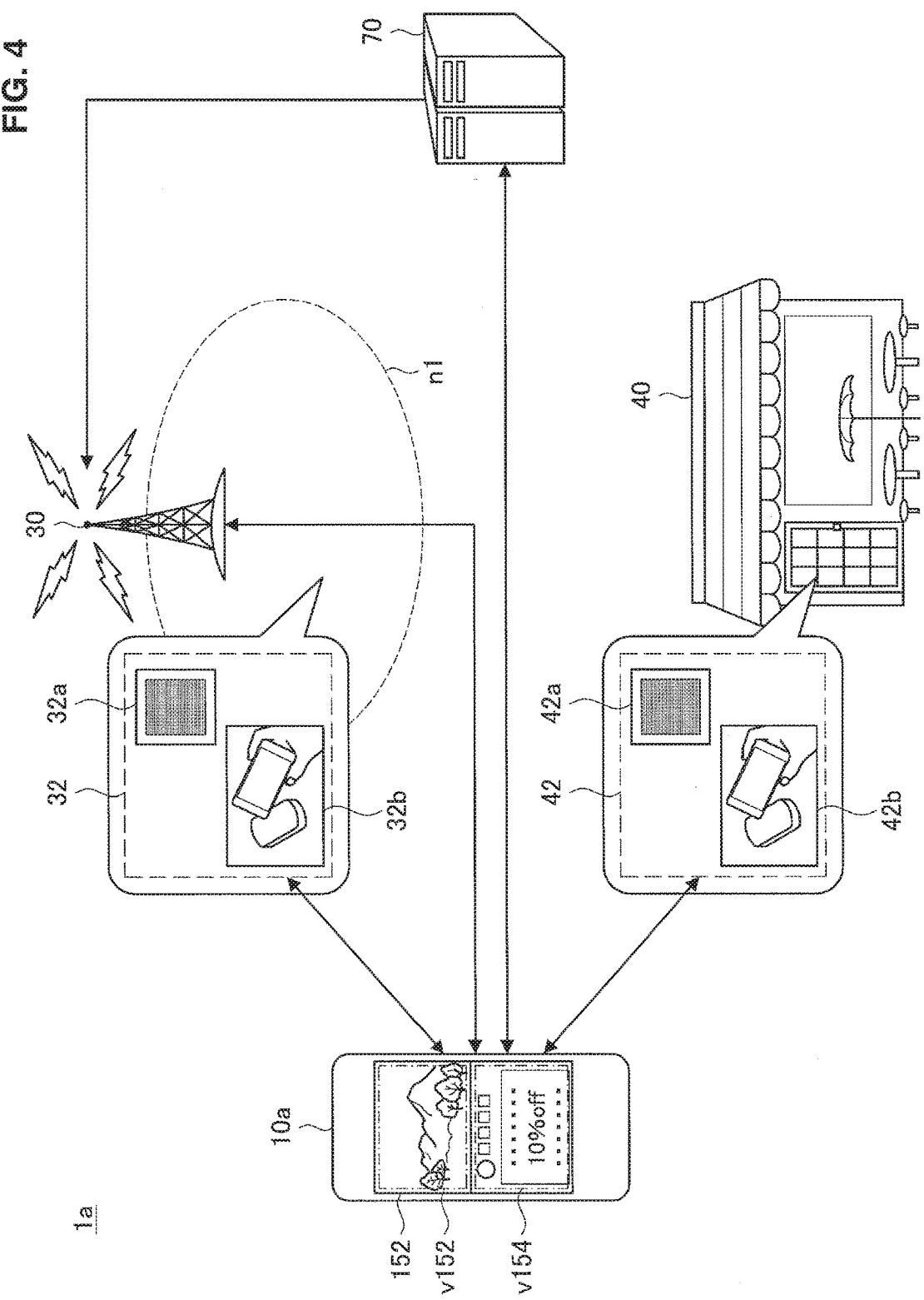
FIG. 4 is a diagram illustrating a schematic system configuration of an information processing system according to a second embodiment of the present disclosure.

First of all, a schematic system configuration of the information processing system 1a according to the present embodiment will be described with reference to FIG. 4. Note that the information processing system 1a according to the present embodiment has the information processing apparatus 10a include a different structural element and perform a different process for acquiring privilege information on the basis of right information from the information processing system 1 according to the first embodiment does. Thus, different parts of the information processing system 1a according to the present embodiment from those of the information processing system 1 according to the first embodiment will be chiefly described below, but the same parts as those of the information processing system 1 will not be described in detail.

As discussed above, the management server 70 manages privilege information in the information processing system 1a according to the present embodiment. Specifically, the management server 70 is configured to be capable of reading out privilege information associated with predetermined right information in advance from a predetermined storage apparatus. For example, privilege information may be managed in a database. In this case, the management server 70 accesses the database to read out privilege information. Information associated with the privilege information can be, for example, right information itself, or information for identifying the right information as long as the information associated with the privilege information can identify the right information.

The authentication device 42 is configured to be capable of identifying right information associated with the privilege information provided by the management server 70 through authentication in the present embodiment. Specifically, the authentication device 42 is configured to be capable of reading out information that can identify the right information associated with the privilege information from a predetermined storage apparatus. Information that can identify right information can be, for example, right information itself or identification information for identifying the right information.

If the information processing apparatus 10a acquires right information, and then accesses the predefined authentication device 42, authentication is performed between the information processing apparatus 10 and the authentication device 42 with the right information as input information. Additionally, authentication is performed in the same method as that of the information processing system 1 according to the first embodiment, so that it will be not described in detail.

If the authentication between the information processing apparatus 10a and the authentication device 42 based on right information results in success, the information processing apparatus 10a according to the present embodiment reports, to the management server 70, information that can identify the right information as an authentication result. The information to be reported to the management server 70 as an authentication result may be right information itself or identification information for identifying the right information as long as the information to be reported to the management server 70 can identify the right information.

Once the management server 70 acquires the authentication result from the information processing apparatus 10a, the management server 70 extracts privilege information corresponding to the right information reported as the authentication result, and provides the extracted privilege information to the information processing apparatus 10a. The above describes an example in which privilege information generated in advance is managed in a storage apparatus from which the management server 70 can read out the privilege information, but the management server 70 itself may be configured to generate privilege information.

Configured in this way, the information processing system 1a according to the present embodiment can have the management server 70 centrally manage privilege information. This can reduce a load for updating privilege information because it is only privilege information managed by the management server 70 that is updated when the content of privilege information is changed in the presence of a plurality of authentication devices 42.

Any of different authentication devices 42 may be selected as an authentication device on which authentication can be performed, and then the management server 70 may provide the information processing apparatus 10a with privilege information different in accordance with the authentication device 42 on which the authentication is performed.

For example, the management server 70 may manage privilege information in association with predetermined right information and object identification information for identifying the authentication device 42.

In this case, the information processing apparatus 10a acquires, from the authentication device 42 on which the authentication is performed, object identification information corresponding to the authentication device 42, and reports the acquired object identification information to the management server 70 as an authentication result in addition to information that can identify the right information.

Once the management server 70 acquires the authentication result from the information processing apparatus 10a, the management server 70 extracts privilege information associated with the right information and the object identification information reported as the authentication result, and provides the extracted privilege information to the information processing apparatus 10a.

This configuration makes it possible, for example, to select any of the spots (stores) 40 and receive a privilege on the basis of a single piece of right information, and to switch the content of a privilege in accordance with the selected spot 40. Accordingly, for example, even if the spots 40 are of different store types, it is still possible to offer a privilege in accordance with a service provided by the store.

2.2. Configuration of Information Processing Apparatus

Figure 5:
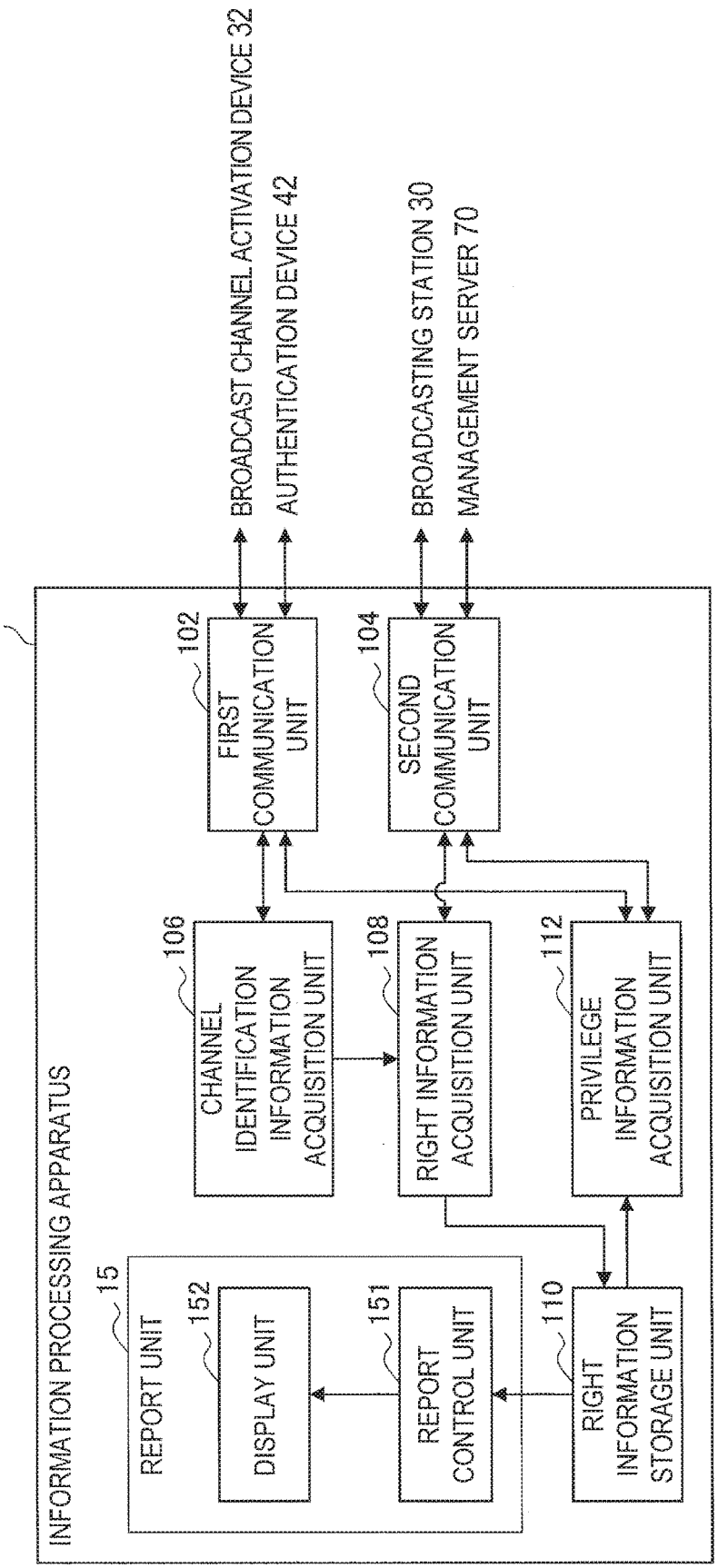
FIG. 5 is a block diagram illustrating a configuration of the information processing apparatus according to the embodiment.

Next, the configuration of the information processing apparatus 10a according to the present embodiment will be described with reference to FIG. 5. FIG. 5 is a block diagram illustrating a configuration of an information processing apparatus 10a according to the present embodiment. The information processing apparatus 10a according to the present embodiment is different from the information processing apparatus 10 according to the first embodiment in the operation of the privilege information acquisition unit 112. Thus, the privilege information acquisition unit 112, which is different among the structural elements of the information processing apparatus 10a according to the present embodiment from that of the information processing apparatus 10 according to the first embodiment, will be chiefly described below, but the other structural elements will not described in detail.

The privilege information acquisition unit 112 establishes communication with the authentication device 42 when the information processing apparatus 10a accesses the authentication device 42. Once the privilege information acquisition unit 112 establishes communication with the authentication device 42, the privilege information acquisition unit 112 reads out right information from the right information storage unit 110 and reports the read-out right information to the authentication device 42 through the established communication.

The privilege information acquisition unit 112 acquires a result of authentication in which right information is used as input information from the authentication device 42 as a response to the right information.

If authentication based on right information between the privilege information acquisition unit 112 and the authentication device 42 results in success, the privilege information acquisition unit 112 reports information that can identify the right information as an authentication result to the management server 70 via the second communication unit 104. The information to be reported to the management server 70 as an authentication result may be right information itself or identification information for identifying the right information as long as the information to be reported to the management server 70 can identify the right information. When a communication means of the right information acquisition unit 108 to receive a broadcast is different from a communication means of the privilege information acquisition unit 112 to communicate with the management server 70, the second communication unit 104 may be separately provided to allow the privilege information acquisition unit 112 to communicate with the management server 70.

The privilege information acquisition unit 112 acquires privilege information corresponding to the right information reported as an authentication result from the management server 70 as a response to the authentication result. That is to say, a user of the information processing apparatus 10a can acquire a privilege on the basis of the acquired privilege information.

2.3. Processes

Figure 6:
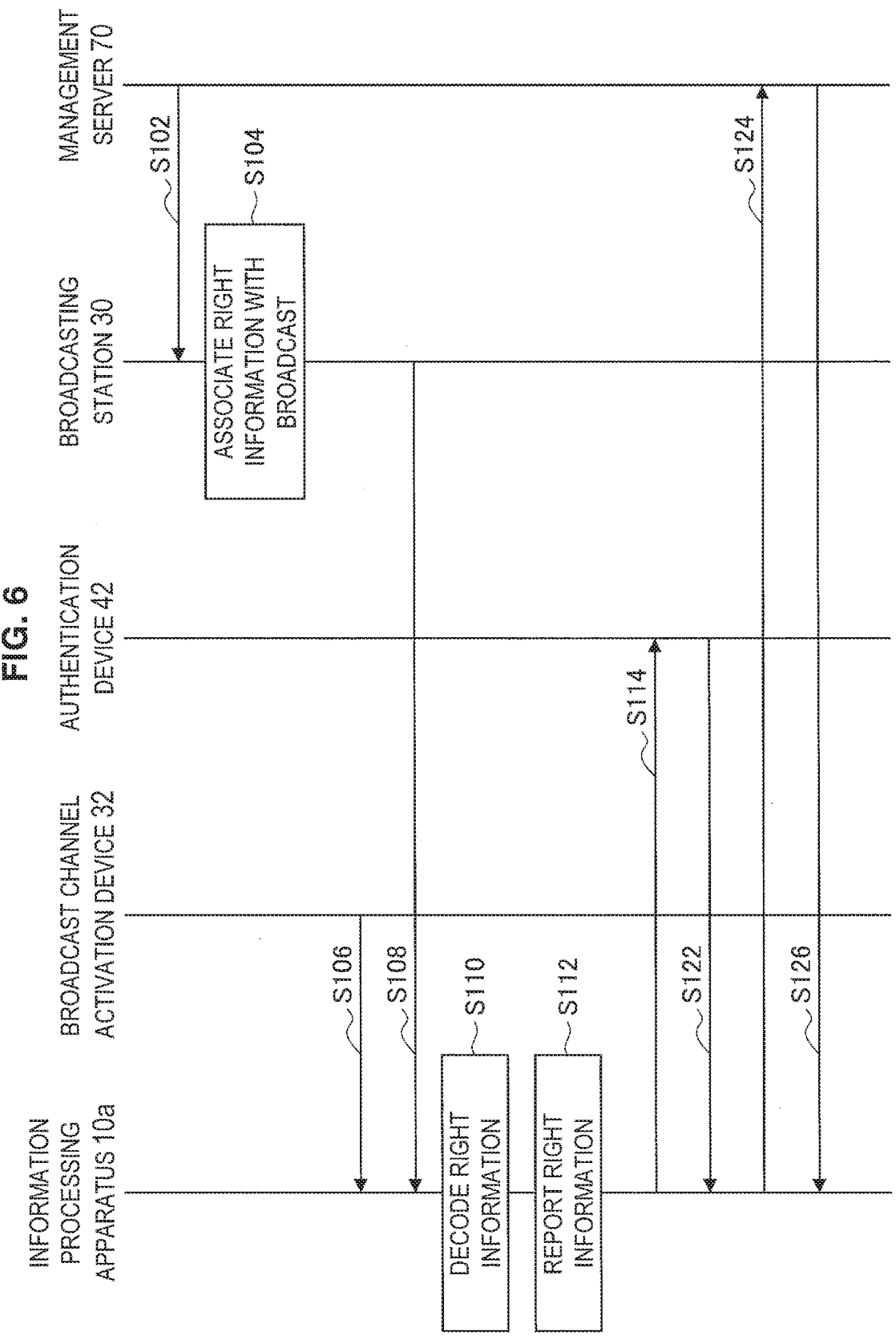
FIG. 6 is a sequence diagram illustrating a flow of a series of processes of the information processing system according to the embodiment.

Next, a flow of a series of operations of the information processing system 1a according to the present embodiment will be described with reference to FIG. 6. FIG. 6 is a sequence diagram illustrating a flow of a series of processes of the information processing system 1a according to the present embodiment. Note that steps S102 to S114 in FIG. 6 are the same as those of the information processing system 1 according to the first embodiment (see FIG. 3). Accordingly, the following chiefly describes the processes in steps S122 to S126, which are different from the operations of the information processing system 1.

(Step S114)

The privilege information acquisition unit 112 establishes communication with the authentication device 42 when the information processing apparatus 10a accesses the authentication device 42. Once the privilege information acquisition unit 112 establishes communication with the authentication device 42, the privilege information acquisition unit 112 reads out right information from the right information storage unit 110 and reports the read-out right information to the authentication device 42 through the established communication.

(Step S122)

The privilege information acquisition unit 112 acquires a result of authentication in which right information is used as input information from the authentication device 42 as a response to the right information.

(Step S124)

If authentication based on right information between the privilege information acquisition unit 112 and the authentication device 42 results in success, the privilege information acquisition unit 112 reports information that can identify the right information as an authentication result to the management server 70.

(Step S126)

Once the management server 70 acquires the authentication result from the information processing apparatus 10a, the management server 70 extracts privilege information corresponding to the right information reported as the authentication result, and provides the extracted privilege information to the information processing apparatus 10a.

The privilege information acquisition unit 112 acquires privilege information corresponding to the right information reported as an authentication result from the management server 70 as a response to the authentication result. That is to say, a user of the information processing apparatus 10a can acquire a privilege on the basis of the acquired privilege information.

2.4. Modification 1

Next, an information processing system 1a according to a modification 1 of the present embodiment will be described.

The second embodiment has been described with an example in which a user who has accessed the broadcast channel activation device 32 to view a broadcast is guided to the authentication device 42 installed at the predetermined spot 40 and provided with a privilege. Meanwhile, the information processing system 1a according to the modification 1 guides a user to a plurality of spots, and offers a privilege to a user who has visited each spot.

As a specific example, the information processing system 1a may offer a privilege to a user who has viewed a predetermined broadcast in each broadcast area.

In this case, for example, the information processing apparatus 10a may acquire object identification information (which will also be referred to as "object identification information indicating the broadcast channel activation device 32") for identifying the broadcast channel activation device 32 to acquire channel identification information from the broadcast channel activation device 32.

The information processing apparatus 10a receives a broadcast on the basis of the channel identification information acquired from the broadcast channel activation device 32, and acquires right information associated with the broadcast as a data broadcast. The information processing apparatus 10a then associates object identification information indicating the broadcast channel activation device 32 that has acquired the channel identification information with the right information acquired as a data broadcast.

When a result of authentication between the information processing apparatus 10a and the authentication device 42 based on the acquired right information is reported to the management server 70, the information processing apparatus 10a also reports the object identification information indicating the broadcast channel activation device 32. Configured in this way, the management server 70 can recognize which broadcast channel activation device 32 the information processing apparatus 10a has accessed to receive a broadcast and acquire right information associated with the broadcast. Associating position information on each broadcast channel activation device 32 with the object identification information indicating the broadcast channel activation device 32 in advance allows the management server 70 to specify the position of the broadcast channel activation device 32 on the basis of the object identification information.

The use of such a mechanism allows the information processing apparatus 10a to report, to the management server 70, object identification information indicating the broadcast channel activation device 32 serving as an acquisition source of right information used for authentication in each authentication. This allows the management server 70, for example, to recognize the information processing apparatus 10a that has accessed each of the predefined broadcast channel activation devices 32 to acquire right information, and to provide privilege information to the information processing apparatus 10a. That is to say, the information processing system 1a according to the modification 1 makes it possible to offer a privilege to a user who has viewed a broadcast in each broadcast area, for example, like a stamp rally.

Note that it is also possible to limit, in advance, the authentication devices 42 that can perform authentication for each piece of right information acquired by accessing the different broadcast channel activation devices 32.

In this case, the plurality of broadcast channel activation devices 32 are categorized into a plurality of groups (e.g. for each broadcast area), and broadcasts to be received on the basis of access to the broadcast channel activation devices 32 are controlled in a manner that each group acquires different right information. As a specific example, a broadcast associated with right information different for each broadcast area may be distributed, or the broadcast channel activation devices 32 may be installed in a manner that different channel identification information are reported to each group.

Each authentication device 42 is configured to be capable of reading out information for identifying right information corresponding to one or more of groups. This configuration limits the operation of the authentication device 42 in a manner that the authentication device 42 can authenticate only right information that the authentication device 42 can identify among pieces of right information set for respective groups.

As described above, configuring the information processing system 1a makes it possible to guide a user who, for example, has viewed a broadcast in each broadcast area to the different spot 40 in each broadcast area.

Note that is possible to change units in which the broadcast channel activation devices 32 are categorized into a plurality of groups, and association of the each group with each authentication device 42 as appropriate. For example, it is also possible to distribute a different broadcast to each group in a manner that right information associated with the broadcast can be authenticated by any of the authentication devices 42. In this case, each authentication device 42 is configured to be capable of reading out information for identifying right information corresponding to each group.

Only one time access to the authentication device 42 may make it possible to authenticate pieces of right information. In this case, for example, the authentication device 42 may acquire pieces of right information from the information processing apparatus 10a, and authenticate each acquired piece of right information. This configuration frees a user from constant authentication for viewing a broadcast each time, and can reduce a load on a user for authentication.

Privilege information may be provided when authentication is performed among the plurality of authentication devices 42 on the basis of a single piece of right information. In this case, each authentication device 42 reports object identification information for specifying the authentication device 42 itself to the information processing apparatus 10a when authentication is performed between the authentication device 42 and the information processing apparatus 10a. When the information processing apparatus 10a reports a result of the authentication to the management server 70, the information processing apparatus 10a also reports the object identification information acquired from the authentication device 42. Configured in this way, the management server 70 can recognize with which authentication device 42 the authentication has been performed on the information processing apparatus 10a. The management server 70 can thus provide privilege information to the information processing apparatus 10a when the management server 70 can recognize on the basis of the object identification information reported from the information processing apparatus 10a that the authentication has been performed between the information processing apparatus 10a and the predefined authentication devices 42.

2.5. Modification 2

Figure 7:
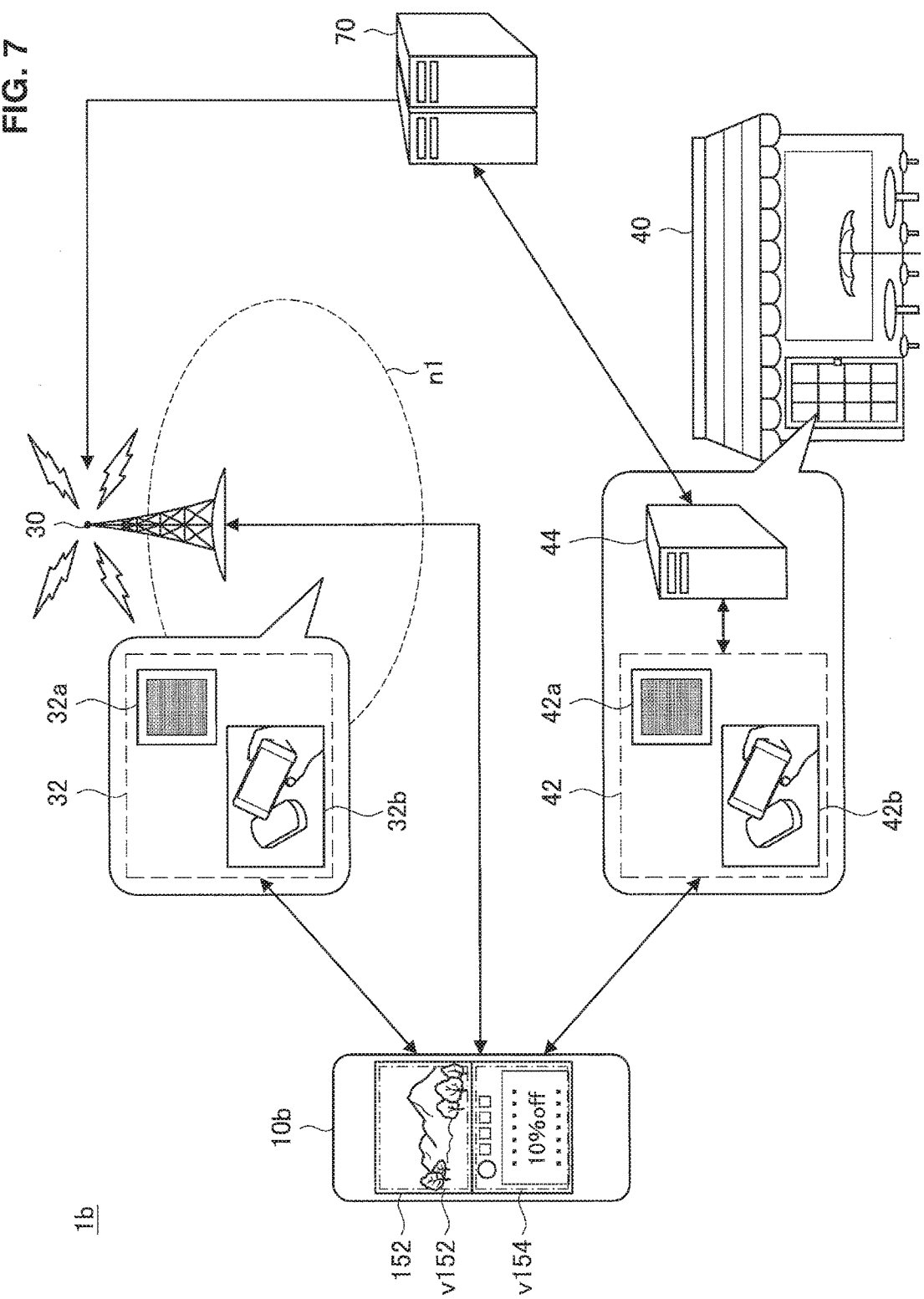
FIG. 7 is a diagram illustrating a schematic system configuration of an information processing system according to a modification 2 of the embodiment.

Next, an information processing system 1b according to a modification 2 will be described. The second embodiment and the modification 1 have been described with an example in which the management server 70 is configured to provide privilege information to the information processing apparatus 10a, thereby having the management server 70 centrally manage the update of privilege information. When the authentication device 42 is configured to provide privilege information to the information processing apparatus 10 in the modification 2 as in the first embodiment and privilege information is updated, the management server 70 distributes the updated privilege information to the authentication device 42. Configured in this way, the information processing system 1b according to the modification 2 has the management server 70 centrally manage the update of privilege information. The information processing system 1b according to the modification 2 will be described below with reference to FIG. 7. FIG. 7 is a diagram illustrating a schematic system configuration of the information processing system 1b according to the modification 2 of the present embodiment.

As illustrated in FIG. 7, the information processing system 1b according to the modification 2 is different from the information processing system 1 according to the first embodiment in that the information processing system 1b according to the modification 2 includes an authentication device management server 44. Thus, the authentication device management server 44, which is different from the information processing system 1 according to the first embodiment, will be chiefly described below.

The authentication device management server 44 is associated with the one or more authentication devices 42, and updates privilege information read out by the one or more authentication devices 42 on the basis of an instruction from the management server 70.

Specifically, the management server 70 has recognized which authentication device 42 is associated with each authentication device management server 44. When privilege information provided by the corresponding authentication device 42 is updated, the management server 70 distributes the updated privilege information to the authentication device management server 44 corresponding to the authentication device 42.

The authentication device management server 44 is configured to be capable of communicating with the management server 70, and when privilege information managed by the management server 70 is updated, the authentication device management server 44 acquires the updated privilege information from the management server 70.

When the authentication device management server 44 acquires the updated privilege information from the management server 70, the authentication device management server 44 accesses a storage apparatus from which the authentication device 42 reads out privilege information, and replaces the privilege information stored in the storage apparatus with the updated privilege information acquired from the management server 70.

Configured in this way, the information processing system 1b according to the modification 2 can also have the management server 70 centrally manage privilege information. That is to say, when the content of the privilege information is changed, updating privilege information managed by the management server 70 makes it possible in the presence of the plurality of authentication devices 42 to distribute the updated privilege information to each authentication device 42 via the authentication device management server 44.

2.6. Conclusion

As described above, the information processing systems 1a and 1b according to the present embodiment can have the management server 70 centrally manage privilege information. This can reduce a load for updating privilege information because it is only privilege information managed by the management server 70 that is updated when the content of privilege information is changed in the presence of a plurality of authentication devices 42.

3. Third Embodiment 3.1. System Configuration

Figure 8:
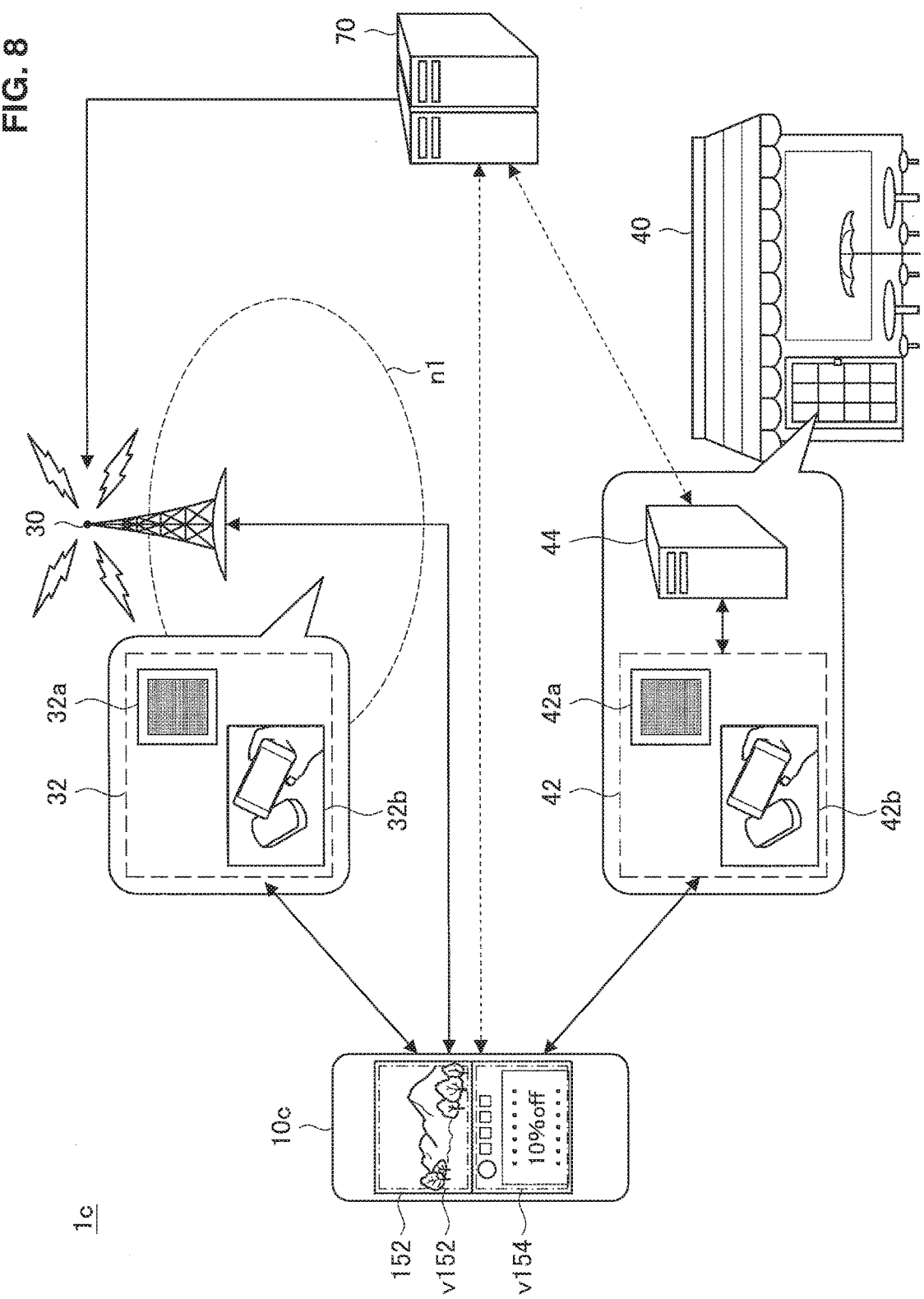
FIG. 8 is a diagram illustrating a schematic system configuration of an information processing system according to a third embodiment of the present disclosure.

Next, an information processing system 1c according to a third embodiment will be described. The information processing system 1c according to the present embodiment provides a mechanism that makes it possible to identify with which broadcast right information is associated as a data broadcast when privilege information is acquired on the basis of the right information. A schematic system configuration of the information processing system 1c according to the present embodiment will be described below with reference to FIG. 8, focusing on different parts from those described in the above embodiments. FIG. 8 is a diagram illustrating a schematic system configuration of the information processing system 1c according to the present embodiment.

The management server 70 according to the present embodiment adds, to right information, identification information (which will also be referred to as "management information") for identifying the right information, and then transmits the right information having the management information to the broadcasting station 30. The management server 70 instructs the broadcasting station 30 to associate the right information with a broadcast distributed via the channel c10 as a data broadcast. The management server 70 may then add, for example, different pieces of management information to pieces of right information associated with different broadcasts. In this case, different pieces of management information are added to the pieces of right information associated with broadcasts as data broadcasts.

Once the broadcasting station 30 is instructed by the management server 70, the broadcasting station 30 associates the acquired right information as a data broadcast with a broadcast designated by the management server 70, and distributes the broadcast and the data broadcast within the area n1. Note that a mechanism that allows the information processing apparatus 10c to receive the broadcast distributed from the broadcasting station 30 and to acquire right information from the received broadcast is the same as that of the information processing system 1 according to the first embodiment, so that it will not be described in detail.

If the information processing apparatus 10c acquires right information, and then accesses the predefined authentication device 42, authentication is performed between the information processing apparatus 10c and the authentication device 42 with the right information as input information. Accordingly, the information processing apparatus 10c acquires privilege information on a privilege corresponding to the right information.

Acquiring the privilege information on the basis of the authentication between the information processing apparatus 10c and the authentication device 42, the information processing apparatus 10c extracts management information added to the right information used for the authentication, and then reports the extracted management information to the management server 70. Configured in this way, the management server 70 can recognize, on the basis of the management information acquired from the information processing apparatus 10c, which broadcast has been viewed by a user who acquires the privilege information. In other words, the information processing system 1c according to the present embodiment makes it possible to quantitatively measure which broadcast has contributed to the transfer of customers to the spot 40, and, for example, to charge broadcasters that have distributed the corresponding broadcast in accordance with the number of transferred customers (i.e. affiliate).

Additionally, the authentication device 42 may report the management information to the management server 70 instead of the information processing apparatus 10c. In this case, the authentication device management server 44 capable of communicating with the management server 70 is installed, for example, as illustrated in FIG. 8. When authentication is performed between the authentication device 42 and the information processing apparatus 10c, the authentication device 42 extracts, from right information acquired from the information processing apparatus 10c, management information added to the right information, and reports the extracted management information to the management server 70 via the authentication device management server 44.

In addition, the authentication device 42 may also report object identification information (which will also be referred to as "object identification information indicating the broadcast channel activation device 32") for identifying the broadcast channel activation device 32 to the management server 70. In this case, when the information processing apparatus 10c acquires channel identification information from the broadcast channel activation device 32, the information processing apparatus 10c also acquires the object identification information indicating the broadcast channel activation device 32.

The information processing apparatus 10c may then extract management information from the right information acquired as a data broadcast on the basis of the channel identification information, and report the extracted management information and the object identification information acquired from the broadcast channel activation device 32 to the management server 70 in association with each other. Configured in this way, the management server 70 can recognize which broadcast channel activation device 32 is accessed to receive the broadcast indicated by the management information.

In addition, as another example, object identification information (which will also be referred to as "object identification information indicating the authentication device 42") for identifying the authentication device 42 may be reported to the management server 70. In this case, when authentication is performed between the information processing apparatus 10c and the authentication device 42, the information processing apparatus 10c also acquires the object identification information indicating the authentication device 42.

The information processing apparatus 10c may then extract management information from the right information used for the authentication, and report the extracted management information and the object identification information acquired from the authentication device 42 to the management server 70 in association with each other. Configured in this way, the management server 70 can recognize, on the basis of the broadcast indicated by the management information, which authentication device 42 the spot 40 to which a user has been guided has.

Note that the broadcast channel activation device 32 and the authentication device 42 do not necessarily have to be identified in the identification method based on pieces of object identification information corresponding to the broadcast channel activation device 32 and the authentication device 42. For example, when the information processing apparatus 10c accesses the broadcast channel activation device 32 and the authentication device 42, the information processing apparatus 10c may acquire position information on the information processing apparatus 10c itself and then specify the broadcast channel activation device 32 and the authentication device 42 on the basis of the acquired position information. Additionally, the position information on the information processing apparatus 10c can be acquired, for example, by a global positioning system (GPS) receiver included in the information processing apparatus 10c. The same applies to each of the information processing systems according to the first and second embodiments.

The information processing apparatus 10c or the authentication device 42 may be operated in a manner that other information that can be recognized by the information processing apparatus 10c and the authentication device 42 is reported to the management server 70. As a specific example, the information processing apparatus 10c may acquire information on a user of the information processing apparatus 10c (e.g. age, sex, and family structure), and report the acquired information to the management server 70 in association with management information. Configured in this way, the management server 70 can recognize what customer group views the broadcast indicated by the management information.

The information processing apparatus 10c or the authentication device 42 may be operated in a manner that control information included in a broadcast and a data broadcast distributed from the broadcasting station 30 is reported to the management server 70. For example, reporting, to the management server 70, identification information for identifying the broadcasting station 30, from which a broadcast and a data broadcast are distributed, allows the management server 70 to recognize in which broadcast area a distributed broadcast has been viewed by a user.

As described above, the management server 70 adds, to right information, management information for identifying the right information, and distributes the right information having the management information to the information processing apparatus 10c as a data broadcast in the information processing system 1c according to the present embodiment. The management server 70 then acquires the management information from the information processing apparatus 10c, thereby identifying, on the basis of the acquired management information, with which broadcast right information used for acquiring privilege information is associated as a data broadcast. Configured in this way, the management server 70 can recognize, on the basis of the management information acquired from the information processing apparatus 10c, which broadcast has been viewed by a user who acquires the privilege information.

3.2. Configuration of Information Processing Apparatus

Figure 9:
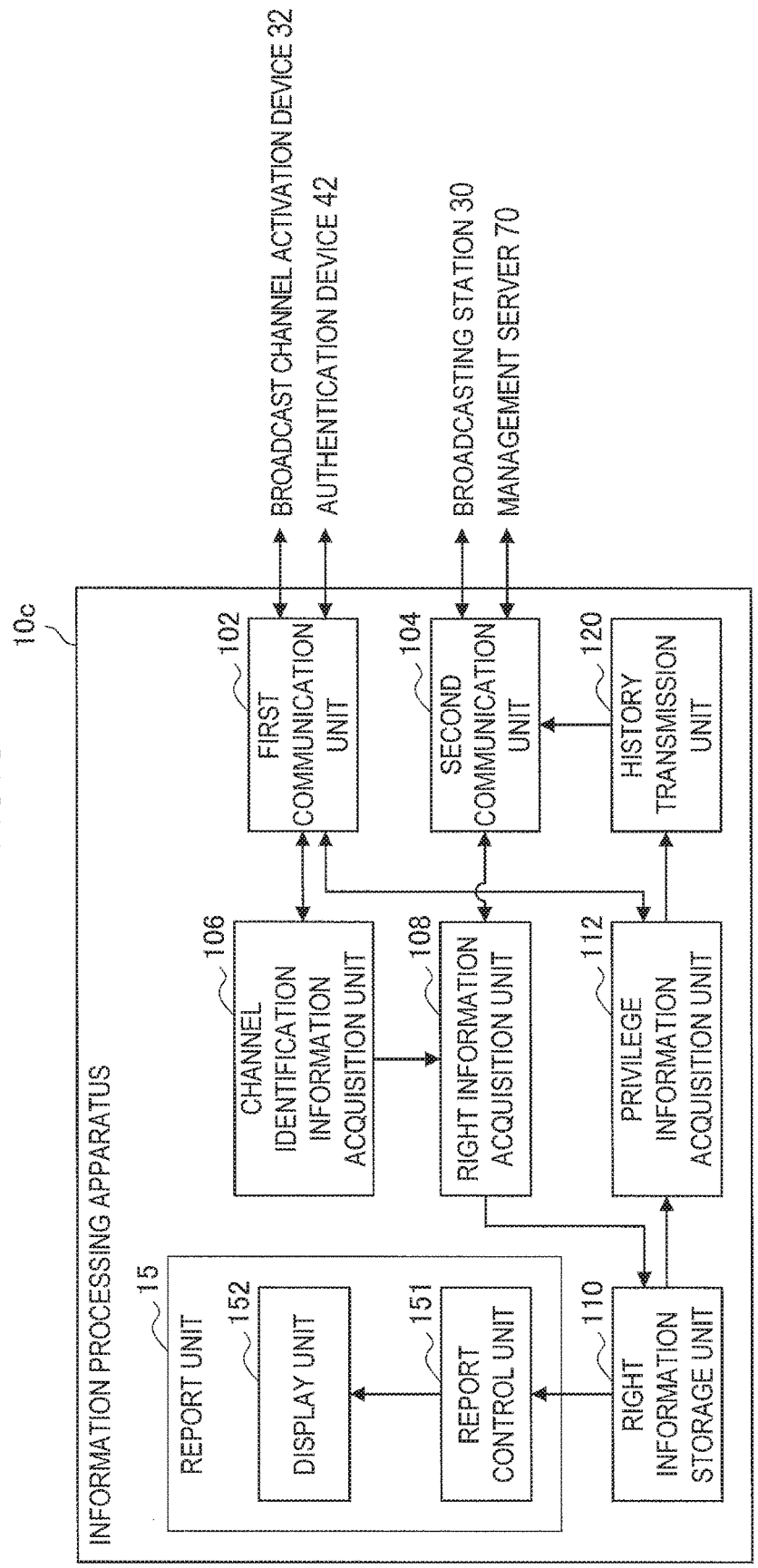
FIG. 9 is a block diagram illustrating a configuration of the information processing apparatus according to the embodiment.

Next, the configuration of the information processing apparatus 10c according to the present embodiment will be described with reference to FIG. 9. FIG. 9 is a block diagram illustrating the configuration of the information processing apparatus 10c according to the present embodiment. The information processing apparatus 10c according to the present embodiment is different from the information processing apparatus 10 according to the first embodiment (see FIG. 2)

in that the information processing apparatus 10c according to the present embodiment includes a history information transmission unit 120. Thus, the history information transmission unit 120, which is different among the structural elements of the information processing apparatus 10c according to the present embodiment from that of the information processing apparatus 10 according to the first embodiment, will be chiefly described below, but the other structural elements will not described in detail.

The privilege information acquisition unit 112 establishes communication with the authentication device 42 when the information processing apparatus 10c accesses the authentication device 42. Once the privilege information acquisition unit 112 establishes communication with the authentication device 42, the privilege information acquisition unit 112 reads out right information from the right information storage unit 110 and reports the read-out right information to the authentication device 42 through the established communication.

The privilege information acquisition unit 112 acquires privilege information from the authentication device 42 as a response to the right information. The operations so far are the same as those of the information processing apparatus 10 according to the first embodiment.

Once the privilege information acquisition unit 112 acquires privilege information from the authentication device 42 (i.e. authentication between the information processing apparatus 10c and the authentication device 42 is completed), the privilege information acquisition unit 112 outputs right information used for acquiring the privilege information to the history information transmission unit 120.

The history information transmission unit 120 acquires right information from the authentication device 42. The history information transmission unit 120 extracts management information added to the acquired right information, and reports the extracted management information to the management server 70. Configured in this way, the management server 70 can recognize, on the basis of the management information acquired from the history information transmission unit 120, which broadcast has been viewed by a user who acquires the privilege information.

Additionally, the history information transmission unit 120 may also report object identification information indicating the broadcast channel activation device 32, the object identification information corresponding to the right information, and object identification information indicating the authentication device 42 to the management server 70.

For example, it will be described below that object identification information indicating the broadcast channel activation device 32 is reported to the management server 70.

In this case, the channel identification information acquisition unit 106 acquires, from the broadcast channel activation device 32 from which channel identification information is acquired, the object identification information indicating the broadcast channel activation device 32. The channel identification information acquisition unit 106 then associates the acquired object identification information indicating the broadcast channel activation device 32 with right information received as a data broadcast on the basis of the channel identification information.

This allows the history information transmission unit 120 to extract object identification information indicating the broadcast channel activation device 32 from the right information acquired from the privilege information acquisition unit 112.

As another example, it will be described below that object identification information indicating the authentication device 42 is reported to the management server 70.

In this case, the privilege information acquisition unit 112 acquires, from the authentication device 42 on which authentication has been performed, the object identification information indicating the authentication device 42. The privilege information acquisition unit 112 then associates the acquired object identification information indicating the authentication device 42 with the right information used for the authentication.

This allows the history information transmission unit 120 to extract object identification information indicating the authentication device 42 from the right information acquired from the privilege information acquisition unit 112.

As discussed above, when the information processing apparatus 10c accesses the broadcast channel activation device 32 and the authentication device 42, the information processing apparatus 10c may acquire position information on the information processing apparatus 10c itself and then specify the broadcast channel activation device 32 and the authentication device 42 on the basis of the acquired position information. For example, FIG. 10 is block diagram illustrating another instance of the information processing apparatus 10c according to the present embodiment, and illustrates the configuration of an information processing apparatus 10d for specifying the broadcast channel activation device 32 and the authentication device 42 on the basis of position information.

As illustrated in FIG. 10, the information processing apparatus 10d includes a position information acquisition unit 140. The position information acquisition unit 140 is configured, for example, with a GPS receiver.

When the channel identification information acquisition unit 106 accesses the broadcast channel activation device 32, the channel identification information acquisition unit 106 acquires position information on the information processing apparatus 10d from the position information acquisition unit 140. The channel identification information acquisition unit 106 associates, as position information on the broadcast channel activation device 32, the position information acquired from the position information acquisition unit 140 with right information received as a data broadcast on the basis of a channel identification information acquisition unit acquired from the broadcast channel activation device 32.

This allows the history information transmission unit 120 to extract the position information on the broadcast channel activation device 32 from the right information acquired from the privilege information acquisition unit 112, and to report the extracted position information on the broadcast channel activation device 32 to the management server 70.

When the privilege information acquisition unit 112 accesses the authentication device 42, the privilege information acquisition unit 112 acquires position information on the information processing apparatus 10d from the position information acquisition unit 140. The privilege information acquisition unit 112 then associates the position information acquired from the position information acquisition unit 140 with the right information used for the authentication as position information on the authentication device 42.

This allows the history information transmission unit 120 to extract the position information on the authentication device 42 from the right information acquired from the privilege information acquisition unit 112, and to report the extracted position information on the authentication device 42 to the management server 70.

3.3. Processes

Next, a flow of a series of operations of the information processing system 1c according to the present embodiment will be described with reference to FIG. 11. FIG. 11 is a sequence diagram illustrating a flow of a series of processes of the information processing system 1c according to the present embodiment. Note that steps S104 to S116 in FIG. 11 are the same as those of the information processing system 1 according to the first embodiment (see FIG. 3). Accordingly, the following chiefly describes steps S132, S134a, and S134b, which are different from the operations of the information processing system 1.

(Step S132)

The management server 70 adds, to right information, management information for identifying the right information, and transmits the right information having the management information to the broadcasting station 30. The management server 70 instructs the broadcasting station 30 to associate the right information with a broadcast distributed via the channel c10 as a data broadcast.

(Step S104)

Once the broadcasting station 30 is instructed by the management server 70, the broadcasting station 30 associates the acquired right information as a data broadcast with a broadcast designated by the management server 70, and distributes the broadcast and the data broadcast within the area n1. Note that the processes in steps S104 to S116 are the same as those of the information processing system 1 according to the first embodiment (see FIG. 3).

That is to say, if the information processing apparatus 10c acquires right information, and then accesses the predefined authentication device 42, authentication is performed between the information processing apparatus 10c and the authentication device 42 with the right information as input information. Accordingly, the information processing apparatus 10c acquires privilege information on a privilege corresponding to the right information.

The privilege information acquisition unit 112 establishes communication with the authentication device 42 when the information processing apparatus 10c accesses the authentication device 42. Once the privilege information acquisition unit 112 establishes communication with the authentication device 42, the privilege information acquisition unit 112 reads out right information from the right information storage unit 110 and reports the read-out right information to the authentication device 42 through the established communication.

The privilege information acquisition unit 112 acquires privilege information from the authentication device 42 as a response to the right information. The operations so far are the same as those of the information processing apparatus 10 according to the first embodiment.

(Step S134a)

Once the privilege information acquisition unit 112 acquires privilege information from the authentication device 42 (i.e. authentication between the information processing apparatus 10c and the authentication device 42 is completed), the privilege information acquisition unit 112 outputs right information used for acquiring the privilege information to the history information transmission unit 120.

The history information transmission unit 120 acquires right information from the authentication device 42. The history information transmission unit 120 extracts management information added to the acquired right information, and reports the extracted management information to the management server 70.

Configured in this way, the management server 70 can recognize, on the basis of the management information acquired from the information processing apparatus 10c, which broadcast has been viewed by a user who acquires the privilege information.

(Step S134b)

Additionally, the authentication device 42 may report the management information to the management server 70 instead of the information processing apparatus 10c. In this case, the authentication device management server 44 capable of communicating with the management server 70 is installed, for example, as illustrated in FIG. 8. When authentication is performed between the authentication device 42 and the information processing apparatus 10c, the authentication device 42 extracts, from right information acquired from the information processing apparatus 10c, management information added to the right information, and reports the extracted management information to the management server 70 via the authentication device management server 44.

3.4. Conclusion

As described above, the management server 70 adds, to right information, management information for identifying the right information, and distributes the right information having the management information to the information processing apparatus 10c as a data broadcast in the information processing system 1c according to the present embodiment. The management server 70 then acquires the management information from the information processing apparatus 10c, thereby identifying, on the basis of the acquired management information, with which broadcast right information used for acquiring privilege information is associated as a data broadcast. Configured in this way, the management server 70 can recognize, on the basis of the management information acquired from the information processing apparatus 10c, which broadcast has been viewed by a user who acquires the privilege information.

Note that the above describes an example in which the authentication device 42 distributes privilege information to the information processing apparatus 10c as in the first embodiment, but the above can also apply to an instance in which the management server 70 distributes privilege information to the information processing apparatus 10c as in the second embodiment. In this case, for example, when the information processing apparatus 10c accesses the management server 70 to acquire privilege information, the information processing apparatus 10c reports management information to the management server 70.

4. Hardware Configuration Example

Software and hardware of the information processing apparatus 10 according to each embodiment of the present disclosure cooperate with each other to implement information processing of the information processing apparatus 10. The following describes an example of the hardware configuration of the information processing apparatus 10 with reference to FIG. 12. FIG. 12 is a block diagram illustrating a hardware configuration example of the information processing apparatus 10.

The information processing apparatus 10 includes, for example, a first communication processing device 819, a GPS antenna 821, a GPS processing device 823, a communication antenna 825, a second communication processing device 827, an image capturing device 837, a central processing unit (CPU) 839, read only memory (ROM) 841, random access memory (RAM) 843, an operation device 847, a display device 849, a decoder 851, a speaker 853, an encoder 855, a microphone 857, and a storage device 859.

The GPS antenna 821 is an example of an antenna that receives a signal from a positioning satellite. The GPS antenna 821 is capable of receiving GPS signals from a plurality of GPS satellites, and inputs the received GPS signals to the GPS processing device 823.

The GPS processing device 823 is an example of a computing unit that computes position information on the basis of the signal received from the positioning satellite. The GPS processing device 823 computes the present position information on the basis of the plurality of GPS signals input from the GPS antenna 821, and outputs the computed position information. Specifically, the GPS processing device 823 computes the positions of the respective GPS satellites from orbit data of the GPS satellites, and computes the distance from each GPS satellite to the information processing apparatus on the basis of differential time between the transmission time and reception time of GPS signals. It is then possible to compute the present three-dimensional position on the basis of the computed position of each GPS satellite and the computed distance from each GPS satellite to the information processing apparatus. Additionally, the orbit data of the GPS satellite used herein may be included, for example, in GPS signals. Alternatively, the orbit data of the GPS satellite may be acquired from an external server via the communication antenna 825.

The first communication processing device 819 is provided, for example, for the information processing apparatus 10 to perform communication in the NFC scheme. The first communication processing device 819 includes, for example, a resonance circuit having predetermined inductance and capacitance, a demodulation circuit that demodulates a signal received by the resonance circuit, and a transmission circuit that amplifies a carrier and transmits the amplified carrier from the resonance circuit. A contactless communication processing unit 835 may cause the storage device 859 to store information acquired from the outside through communication in the NFC scheme. Note that the first communication processing device 819 may be configured to be capable of perform not only communication in the NFC scheme, but also communication that uses sounds, visible light, or infrared rays.

The communication antenna 825 is an antenna having a function of receiving a communication signal, for example, via a mobile communication network and a wireless local area network (LAN) communication network. The communication antenna 825 is capable of supplying the received signal to the second communication processing device 827.

The second communication processing device 827 has a function of performing various kinds of signal processing on the signal supplied from the communication antenna 825. The second communication processing device 827 is capable of supplying a digital signal generated from the supplied analog signal to the CPU 839. Note that the first communication processing device 819, the second communication processing device 827, and the communication antenna 825 may be configured as a single chip.

The image capturing device 837 has a function of shooting a still image or a moving image via a lens under the control of the CPU 839. The image capturing device 837 may cause the storage device 859 to store a shot image. A specific pattern such as a QR Code and a bar code may be read out from an image shot by the image capturing device 837, and information may be decoded from the read-out pattern.

The CPU 839 functions as an operation processing apparatus and a control apparatus, and controls the whole operation of the information processing apparatus 10 in accordance with a variety of programs. The CPU 839 may also be a microprocessor. The CPU 839 can execute various functions in accordance with various programs.

The ROM 841 can store a program, an operation parameter, and the like used by the CPU 839. The RAM 843 can temporarily store a program used upon the execution of the CPU 839 and a parameter changing as necessary upon the execution.

The operation device 847 has a function of generating an input signal for allowing a user to perform a desired operation. The operation device 847 may include an input unit such as a touch sensor, a mouse, a keyboard, a button, a microphone, a switch, and a lever used for a user to input information, and an input control circuit that generates an input signal on the basis of the input from the user and then outputs the generated input signal to the CPU 839.

The display device 849 is an example of an output apparatus, and may be a display apparatus such as a liquid crystal display (LCD) apparatus and an organic light emitting diode (OLED) display apparatus. The display device 849 can provide information to a user by displaying a screen.

The decoder 851 has a function of decoding and performing analogue conversion on input data under the control of the CPU 839. The decoder 851 decodes and performs analogue conversion on audio data input via the communication antenna 825 and the second communication processing device 827, for example, and then outputs the audio signal to the speaker 853. The speaker 853 can output a sound on the basis of the audio signal supplied from the decoder 851.

The encoder 855 has a function of performing digital conversion on and encoding input data under the control of the CPU 839. The encoder 855 can perform digital conversion on and encode an audio signal input from the microphone 857, and then output the audio data. The microphone 857 can collect a sound, and then output the collected sound as an audio signal.

The storage device 859 is an apparatus for data storage, and can include a storage medium, a recording apparatus that records data on the storage medium, a read-out apparatus that reads out data from the storage medium, and a deletion apparatus that deletes data recorded on the storage medium. For example, nonvolatile memory such as flash memory, magnetoresistive random acces memor (MRAM), ferroelectric random access memory (FeRAM), phase change random access memory (PRAM) and electronically erasable and programmable read only memory (EEPROM), and a magnetic recording medium such as a hard disk drive (HDD) may be used as a storage medium.

It is also possible to manufacture a program for causing hardware such as a CPU, ROM, and RAM built in a computer to perform a function corresponding to a structural element in the information processing apparatus. There may also be provided a computer-readable storage medium having the program recorded thereon.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the present technology may also be configured as below.

(1)

An information processing apparatus including:

a channel identification information acquisition unit configured to acquire channel identification information for receiving a broadcast from a first object;

a right information acquisition unit configured to acquire right information for acquiring a privilege, the right information being associated with the broadcast indicated by the channel identification information; and a privilege information acquisition unit configured to establish communication with a second object installed in a predetermined place different from a place of the first object, to execute a process for authentication based on the right information through the communication, and to acquire privilege information indicating the privilege, the privilege information being based on a result of the authentication.

(2)

The information processing apparatus according to (1), wherein the right information has been encoded, wherein the channel identification information acquisition unit acquires key information for decoding the right information from the first object, and wherein the right information acquisition unit decodes the right information on the basis of the acquired key information.

(3)

The information processing apparatus according to (2), wherein the broadcast has been encoded, and wherein the right information acquisition unit decodes the broadcast on the basis of the key information.

(4)

The information processing apparatus according to any one of (1) to (3), wherein the channel identification information is acquired in an area in which the broadcast is receivable.

(5)

The information processing apparatus according to any one of (1) to (4), including:

a report unit configured to report content of the privilege on the basis of the right information.

(6)

The information processing apparatus according to any one of (1) to (5), wherein the channel identification information acquisition unit acquires, from the first object, object identification information for identifying the first object, and wherein the privilege information acquisition unit executes the process for the authentication based on the right information and the object identification information, and acquires the privilege information based on a result of the authentication.

(7)

The information processing apparatus according to any one of (1) to (5), including:

a position information acquisition unit configured to acquire position information indicating a position of the information processing apparatus at which the channel identification information is acquired, wherein the privilege information acquisition unit executes the process for the authentication based on the right information and the position information, and acquires the privilege information based on a result of the authentication.

(8)

The information processing apparatus according to any one of (1) to (7), wherein the privilege information acquisition unit acquires the privilege information through the communication.

(9)

The information processing apparatus according to any one of (1) to (8), wherein communication between the second object and the privilege information acquisition unit is contactless communication.

(10)

The information processing apparatus according to any one of (1) to (9), wherein the channel identification information acquisition unit establishes communication with the first object, and acquires the channel identification information through the communication.

(11)

The information processing apparatus according to (10), wherein communication between the first object and the channel identification information acquisition unit is contactless communication.

(12)

The information processing apparatus according to any one of (1) to (11), wherein the privilege information acquisition unit reports the result of the authentication to an external server, and acquires the privilege information from the external server.

(13)

The information processing apparatus according to any one of (1) to (12), including:

a history transmission unit configured to transmit, to an external server, a history that pertains to at least any of acquisition of the channel identification information, reception of the broadcast, and the authentication.

(14)

The information processing apparatus according to (13), wherein the history is used for recognizing a use status of the right information associated with the broadcast.

(15)

The information processing apparatus according to any one of (1) to (14), wherein the channel identification information acquisition unit acquires the channel identification information from each of the first objects that are different from each other, wherein the right information acquisition unit acquires the right information for each broadcast, the right information being associated with the broadcast indicated by the channel identification information acquired from each of the first objects, and wherein the privilege information acquisition unit executes the process for the authentication on the right information for each broadcast, and acquires the privilege information based on a result of a series of the executed authentication.

(16)

The information processing apparatus according to (15), wherein a plurality of the second objects are installed, and wherein the privilege information acquisition unit executes the process for the authentication corresponding to the right information for each broadcast through communication with the second objects that are different from each other among the plurality of second objects.

(17)

The information processing apparatus according to any one of (1) to (14),
wherein a plurality of the second objects are installed, and
wherein the privilege information acquisition unit acquires the privilege information based on a result of the authentication between the information processing apparatus and each of the plurality of second objects.

(18)
An information processing method including:
acquiring, from a first object that stores channel identification information for receiving a broadcast, the channel identification information;
acquiring right information for acquiring a privilege, the right information being associated with the broadcast received on the basis of the channel identification information; and
establishing communication with a second object installed in a predetermined place different from a place of the first object, executing a process for authentication based on the right information through the communication, and acquiring privilege information for acquiring the privilege, the privilege information being based on a result of the authentication.

(19)
A program for causing a computer to execute:
a function of acquiring, from a first object that stores channel identification information for receiving a broadcast, the channel identification information;
a function of acquiring right information for acquiring a privilege, the right information being associated with the broadcast received on the basis of the channel identification information; and
a function of establishing communication with a second object installed in a predetermined place different from a place of the first object, executing a process for authentication based on the right information through the communication, and acquiring privilege information for acquiring the privilege, the privilege information being based on a result of the authentication.

REFERENCE SIGNS LIST 1, 1a, 1b, 1c, 1d information processing system
10, 10a, 10c, 10d information processing apparatus
102 first communication unit
104 second communication unit
106 channel identification information acquisition unit
108 right information acquisition unit
110 right information storage unit
112 privilege information acquisition unit
120 history information transmission unit
140 position information acquisition unit
15 report unit
151 report control unit
152 display unit
30 broadcasting station
32 broadcast channel activation device
42 authentication device
44 authentication device management server
70 management server

The invention claimed is:

1. An information processing apparatus, comprising:
a memory configured to store instructions; and
a processor configured to execute the instructions to:
transmit, to a first device, user information that indicates a user of the information processing apparatus;
acquire, from the first device, channel identification information and key information;
receive, from a second device, broadcast data and right information, based on the channel identification information,
wherein the second device is at a first place;
decode the broadcast data based on the key information;
output the decoded broadcast data on a display of the information processing apparatus;
extract management information from the right information based on the channel identification information, wherein the management information identifies at least one of the broadcast data output on the information processing apparatus or the right information;
transmit the management information to a third device, wherein the third device is at a second place different from the first place; and
obtain, from the third device, privilege information, that indicates a privilege corresponding to the user, based on the transmitted management information.

2. The information processing apparatus according to claim 1,
wherein the right information is encoded, and
wherein the processor is further configured to decode the right information based on the key information.

3. The information processing apparatus according to claim 1, wherein the processor is further configured to receive the broadcast data and acquire the channel identification information in a same area.

4. The information processing apparatus according to claim 1, wherein the processor is further configured to report content of the privilege based on the right information.

5. The information processing apparatus according to claim 1, wherein the processor is further configured to:
receive, from the first device, object identification information; and
identify the first device based on the object identification information.

6. The information processing apparatus according to claim 1,
wherein the processor is further configured to:
acquire position information to indicate a position of the information processing apparatus at which the channel identification information is acquired; and
transmit the position information to the third device; and
wherein the third device is configured to authenticate the right information based on the transmitted position information.

7. The information processing apparatus according to claim 1, wherein the processor is further configured to communicate with the third device based on a contactless communication.

8. The information processing apparatus according to claim 1, wherein the processor is further configured to acquire the channel identification information through a contactless communication between the information processing apparatus and the first device.

9. The information processing apparatus according to claim 1, wherein the processor is further configured to transmit, to an external server, a history that pertains to at least one of the acquisition of the channel identification information or the reception of the broadcast data.

10. The information processing apparatus according to claim 9, wherein the history indicates a use status of the right information.

11. The information processing apparatus according to claim 1, wherein the privilege corresponds to at least one of a coupon or a service that offers points to the user.

12. An information processing method, comprising:
in an information processing apparatus:
transmitting, to a first device, user information that indicates a user of the information processing apparatus;
acquiring, from the first device, channel identification information and key information;
receiving, from a second device, broadcast data and right information, based on the channel identification information,
wherein the second device is at a first place in real space;
decoding the broadcast data based on the key information;
outputting the decoded broadcast data on a display of the information processing apparatus;
extracting management information from the right information based on the channel identification information, wherein the management information identifies at least one of the broadcast data output on the information processing apparatus or the right information;
transmitting the management information to a third device, wherein the third device is at a second place different from the first place; and
obtaining, from the third device, privilege information, that indicates a privilege corresponding to the user, based on the transmitted management information.

13. A non-transitory, computer-readable medium having stored thereon, computer executable instructions that when executed by a computer of an information processing apparatus, cause the computer to execute operations, the operations comprising:
transmitting, to a first device, user information that indicates a user of the information processing apparatus;
acquiring, from the first device, channel identification information and key information;
receiving, from a second device, broadcast data and right information, based on the channel identification information,
wherein the second device is at a first place in real space;
decoding the broadcast data based on the key information;
outputting the decoded broadcast data on a display of the information processing apparatus;
extracting management information from the right information based on the channel identification information, wherein the management information identifies at least one of the broadcast data output on the information processing apparatus or the right information;
transmitting the management information to a third device, wherein the third device is at a second place different from the first place; and
obtaining, from the third device, privilege information, that indicates a privilege corresponding to the user, based on the transmitted management information.

* * * * *